(12) United States Patent
Wright

(10) Patent No.: US 10,687,631 B2
(45) Date of Patent: Jun. 23, 2020

(54) CONVERTIBLE BED FRAME AND CONVERTIBLE COVER

(71) Applicant: David Wright, London (CA)

(72) Inventor: David Wright, London (CA)

( * ) Notice: Subject to any disclaimer, the term of this patent is extended or adjusted under 35 U.S.C. 154(b) by 596 days.

(21) Appl. No.: 15/530,104

(22) PCT Filed: Jun. 15, 2015

(86) PCT No.: PCT/CA2015/050553
§ 371 (c)(1),
(2) Date: Dec. 2, 2016

(87) PCT Pub. No.: WO2015/196279
PCT Pub. Date: Dec. 30, 2015

(65) Prior Publication Data
US 2018/0325271 A1    Nov. 15, 2018

Related U.S. Application Data

(63) Continuation of application No. 14/736,251, filed on Jun. 10, 2015, now abandoned.

(51) Int. Cl.
*A47C 19/04*    (2006.01)
*A47C 29/00*    (2006.01)
(Continued)

(52) U.S. Cl.
CPC .......... *A47C 19/045* (2013.01); *A47C 17/84* (2013.01); *A47C 19/02* (2013.01); *A47C 19/028* (2013.01);
(Continued)

(58) Field of Classification Search
CPC ....... A47C 21/00; A47C 29/003; A47C 19/20; A47C 19/205; A47C 19/02; A47C 19/028;
(Continued)

(56) References Cited

U.S. PATENT DOCUMENTS

| 544,630 | A | * | 8/1895 | Scherer | ................... | A47C 17/32 5/8 |
| 593,445 | A | * | 11/1897 | Toal | ........................ | A47C 17/84 5/279.1 |

(Continued)

FOREIGN PATENT DOCUMENTS

EP    1314379 A1 *    5/2003    ............. A47C 17/32

*Primary Examiner* — David R Hare

(57) ABSTRACT

A bed frame and cover that is capably joinable to another bed frame and cover and capably disjoinable from another bed frame and cover and of which comprises a mattress supporting plate which is capable of moving vertically within the cover. The cover is a unified structure of walls and a roof with pivotally connected doors that capably form an enclosure around the plate or of which are stowable on the roof. The entire cover is capable of 360 degree bi-directional rotation around the entire plate as well as vertical movement. A capably pivotable mattress attachment is stowable under the plate or extends to form a contiguous mattress surface of which is supported by rods that connect to another bed frame and cover. The bed frame and cover is capable of a multitude of configurations dependent on bed frame, mattress attachment and the cover's optional positioning.

4 Claims, 41 Drawing Sheets

(51) Int. Cl.
*A47C 19/02* (2006.01)
*A47C 17/84* (2006.01)
*A47C 19/20* (2006.01)
*A47C 21/00* (2006.01)
*B60B 33/00* (2006.01)
*F16B 12/10* (2006.01)
*F16B 12/54* (2006.01)

(52) U.S. Cl.
CPC ............... *A47C 19/04* (2013.01); *A47C 19/20* (2013.01); *A47C 21/00* (2013.01); *A47C 29/003* (2013.01); *B60B 33/0036* (2013.01); *F16B 12/10* (2013.01); *F16B 12/54* (2013.01); *F16B 2012/103* (2013.01)

(58) Field of Classification Search
CPC ....... A47C 19/04; A47C 19/045; A47C 17/84; F16B 12/54; F16B 12/10; F16B 2012/103; B60B 33/0036
See application file for complete search history.

(56) References Cited

U.S. PATENT DOCUMENTS

| | | | | |
|---|---|---|---|---|
| 2,052,790 A * | 9/1936 | Norton | ................... | A47C 17/84 5/10.2 |
| 2,644,168 A * | 7/1953 | Sandow | ................. | A47C 17/32 5/18.1 |
| 4,524,471 A * | 6/1985 | Mansouri | ................. | A47C 17/32 5/511 |
| 4,837,877 A * | 6/1989 | Hamada | ................. | A47C 17/84 5/10.2 |
| 5,020,169 A * | 6/1991 | Hamada | ................. | A47C 17/84 5/10.2 |
| 5,111,543 A * | 5/1992 | Epshetsky | .............. | A47C 21/00 5/1 |
| 5,797,152 A * | 8/1998 | Wiesch | ................... | A47C 17/36 5/11 |
| 6,550,081 B2 * | 4/2003 | Vilsmeier | .............. | A47C 17/84 5/11 |
| 6,651,273 B2 * | 11/2003 | Vilsmeier | .............. | A47C 17/84 5/10.2 |
| 6,772,458 B2 * | 8/2004 | Ellen | ..................... | A47C 21/08 135/143 |
| 7,047,991 B2 * | 5/2006 | Kline | ..................... | A47C 21/08 135/96 |
| 2007/0294827 A1 * | 12/2007 | Carr | ....................... | A47C 21/00 5/600 |
| 2014/0159410 A1 * | 6/2014 | Rasmussen | ............ | A47C 19/20 296/24.33 |
| 2016/0015186 A1 * | 1/2016 | Wright | ................. | A47C 29/003 5/400 |

* cited by examiner

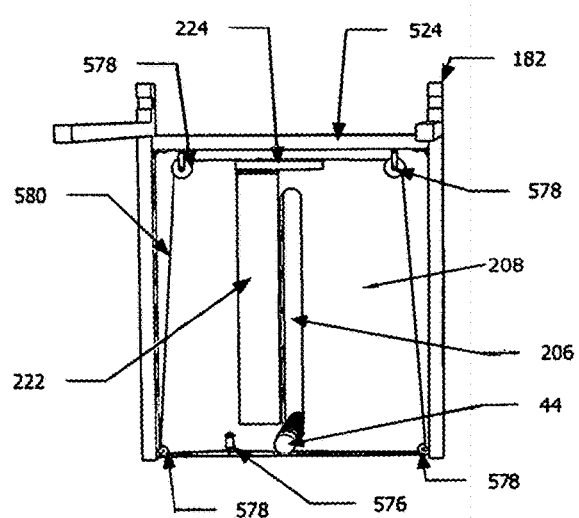
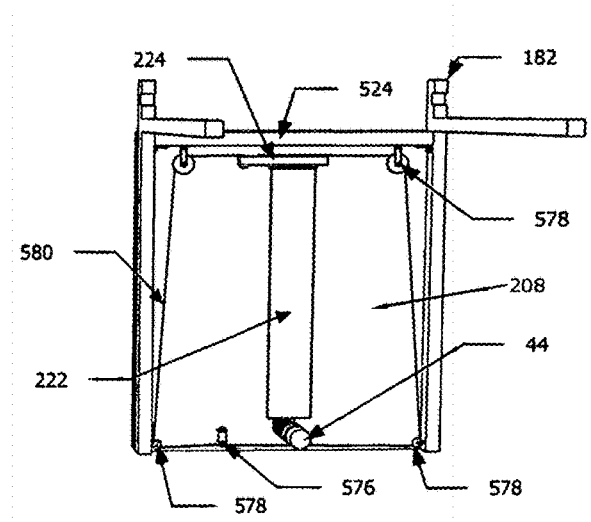
FIG. 43
FIG. 44

CONVERTIBLE BED FRAME AND CONVERTIBLE COVER

FIELD OF THE INVENTION

The present invention relates to furniture, and more particularly, to a convertible bed frame and convertible cover.

BACKGROUND

A. The present invention relates to furniture. More specifically, the present invention relates to a convertible bed frame and convertible cover.

B. Conventionally, bed partners have shared an open-mattress within the same bed. However, bed partners may suffer an unsatisfactory bed experience caused by unwanted noise, unwanted light and undesirable temperature. Some efforts may have been made to enclose the bed unit. However, there are times when one bed partner may disrupt the other bed partner when both partners share the same bed unit. For example, bed-partner disruption may be caused by: snoring, noise from respirator and continuous positive airway pressure devices, electrical bed apparatuses, somniloquy, coughing, reading with a light on, watching television, operating a computing device, tossing and turning, pulling bed covers, and entering and exiting the bed.

It would be advantageous for a bed frame and cover that is capably disjoinable from a like bed unit and joinable to a like bed unit such that the bed unit or combination of bed units transform to a multitude of configurations such that, at the least, the aforementioned problems would be solved.

Some of these configurations could include: the traditional open, contiguous-surface mattress bed, two separate bed units each with open mattress, two separate bed units of which one is an open mattress and the other is a cover-enclosed mattress, two separate bed units each with a cover-enclosed mattress and one unified bed unit with a contiguous-mattress surface wherein the individual covers of the bed frames are configured so as to form a complete enclosure around the single, larger contiguous-surface mattress.

It would be advantageous for a bed frame and cover that is capably disjoinable from a like bed unit and joinable to a like bed unit to comprise of: a bed frame of which is capable of vertical movement; a cover of which is a single, unified structure of which is capable of bi-directional 360 degree rotation around the entire mattress and of which is also capable of vertical movement; a mattress attachment of which avoids interference between the support structures of the covers of the individual bed units and such that the mattress attachment capably pivots into position between the two bed units so as to form a contiguous-mattress surface; rods which support the mattress attachment and capably extend into the other like bed unit so as to join the bed units and doors of which are capably moveable and capably pivotable such that the doors capably form a complete enclosure around the bed unit, are capably stowable upon the cover's roof and in a joined configuration, capably move to create a single, larger enclosure of the joined bed units.

BRIEF SUMMARY OF THE INVENTION

In accordance with the present invention, there is provided a bed frame and also a cover of which the cover is optional and independent from the bed frame.

In relation to the bed frame, the bed frame, a component of a bed-unit as described in the list of definitions, comprises of a bed frame and a mattress which may be of a plurality of dimensions, not limited to but including and commonly known as a single-sized, twin-sized, double-sized, full-sized, queen-sized or king-sized mattress. A bed-unit comprising of a single-sized, twin-sized, double-sized, full-sized, queen-sized or king-sized mattress may generally convert to a bed-unit with increased mattress area or, for a bed-unit comprising of a double-sized, full-sized, queen-sized or king-sized mattress may generally covert to a bed-unit with decreased mattress area. This is accomplished for bed-units comprising of a single-sized, twin-sized, double-sized, full-sized, queen-sized or king-sized mattress by employing a mattress attachment which is a mattress attached to a mattress plate of the bed-unit which generally swings 90 degrees upwards to increase mattress area, or for bed-units comprising of a double-sized, full-sized, queen-sized or king-sized mattress, may generally swing 90 degrees downwards to decrease mattress area. Additionally, a bed-unit joined to another bed-unit, forming a joined bed-pairing or a bed-unit with the mattress attachment in a raised position joined to another bed-unit, a joined bed-pairing, generally and without limitation, increases mattress area and a bed-unit within a joined bed-pairing that is separated from the other bed-unit generally and without limitation, decreases mattress area. A mattress platform group may generally comprise of a single center beam, two columns, two cylindrical connecting rods, two rod adapters, two receptacles, two receptacle frames, four cross supports, four cross support plates, one mattress plate, and one mattress. Each end of the mattress platform can independently be vertically shifted upwards or downwards. This is accomplished by motors placed beneath each end of the mattress platform which when activated raises or lowers the corresponding end of the mattress platform. To summarize, this enables both ends of the mattress platform to be raised and lowered or one end of the mattress platform to be raised and lowered. A mattress platform may generally comprise of a single center beam, two columns, four cross supports, four cross support plates, one mattress plate, and one mattress. The mattress platform can be rotationally tilted generally up to 360 degrees along its horizontal axis. This is accomplished as the cylindrical rods extend completely through the columns of the mattress platform thereby allowing the mattress platform which rests on the cylindrical rods to rotate generally up to 360 degrees along its horizontal axis.

In relation to the cover, the cover is a rigid structure which can generally enclose the mattress platform and is comprised of one rigid frame, two rigid exterior walls each with an elongated cavity such that it enables the cylindrical rod referenced above to pass completely through the cavity, two cylindrical disks of rigid material each with an elongated cavity through the flat surface of the cylindrical disk such that it enables the cylindrical rod to pass completely through the cavity, two rigid support walls each with an elongated cavity such that it enables the cylindrical rod to pass completely through the cavity, two interior walls each with an elongated cavity such that it enables the cylindrical rod to pass completely through the cavity, sound suppression material between the support walls and the interior walls, two doors each comprising of a rigid exterior wall, a rigid interior wall and sound suppressing material between the rigid exterior wall and rigid interior wall, one roof comprising of a rigid exterior wall, a rigid interior wall and sound suppressing material between the rigid exterior wall and rigid interior wall.

The cover, which is optional and independent from the bed frame, can be shifted upwards, downwards and rotated generally up to 360 degrees on its horizontal axis. Rotation is accomplished by mechanized continuous tracks moving generally horizontally upon which the cover's cylindrical disk engages. The mechanized continuous tracks are mounted on the tops of mechanized lifting devices. Shifting of the cover upwards and downwards is accomplished by the mechanized lifting devices mounted beneath the mechanized continuous tracks.

Sound is inhibited from penetrating the interior of the cover as a consequence of the rigid exterior walls, rigid interior walls and sound suppressing material between the walls.

Light is inhibited from penetrating the interior of the cover as a consequence of the rigid exterior and interior walls.

The cover affords an individual or a plurality of individual's privacy while that individual or those individuals perform private actions.

A separation door pivotally hangs from the ceiling of the cover and when pivoted generally downwards to a closed position provides privacy and particularly sound and light suppression for individuals situated on either side of the separation door.

As referenced above, a mattress attachment is attached to the mattress plate. In the raised position, the mattress attachment connected to a twin bed or single bed may create a double bed, full-size bed, queen-size bed or king-size bed, dependent on the width of the mattress attachment. In the raised position, the mattress attachment connected to a double bed or full-size bed may create a queen-size bed or king-size bed, dependent on the width of the mattress attachment. In the raised position, the mattress attachment connected to a queen-size bed may create a king-size bed, dependent on the width of the mattress attachment. In the raised position, the mattress attachment connected to a twin bed or single bed may generally fill the void between two twin beds or single beds positioned apart from each other thereby creating a king-sized bed.

A list of definitions immediately follows:

A bed-unit comprises of one bed frame which may or may not include a cover and may or may not include a step.

A bed-pairing comprises of one bed-unit generally aligned adjacently to another bed-unit with neither mattress of either bed-unit in contact with each other.

A joined bed-pairing comprises of one bed-unit generally aligned adjacently to another bed-unit with the mattress of one bed-unit in general contact with the mattress of the other bed unit or with a mattress attachment between both bed-units and such that the mattress attachment is in general contact with both mattresses of the bed-units.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description.

Referring now to the invention in more detail, in FIG. 1 there is shown bed frame 10, cover 12 and step 14. Cover 12 is generally pivotally joined to bed frame 10 and generally positioned such that the top of cover 470, as referenced in FIG. 49, is over bed frame 10. Step 14 is attached to bed frame 10. Bed frame 10 is generally partially surrounded by cover 12. Step 14 enables access to bed frame 10. The advantages of the present invention include, without limitation, conversion of cover 12 from a plurality of positions situate to bed frame 10 to a position overhead of bed frame 10.

Referring now to the invention in more detail, in FIG. 3 there is shown a joined bed-pairing. Cover 12 is generally pivotally joined to bed frame 10 and generally positioned such that the top of cover 470, as referenced in FIG. 50, is generally parallel to top lateral brace 28 and the top of cover 470 is generally positioned underneath top lateral brace 28. Step 14 is attached to bed frame 10. Step 14 enables access to bed frame 10. The advantages of the present invention include, without limitation, conversion of cover 12 from a plurality of positions situate to bed frame 10 to a position generally underneath top lateral brace 28. Further, there exists the general advantage of generally joining together a bed-unit and mattress attachment 178 to another bed-unit thereby forming a joined bed-pairing. Further, there exists the general advantage such that door 244, as referenced in FIG. 2, is in an open position.

Referring now to the invention in more detail, in FIG. 4 there is shown a joined bed-pairing. Cover 12 is generally pivotally joined to bed frame 10 and generally positioned such that the top of cover 470, as referenced in FIG. 49, is over bed frame 10. Step 14 is attached to bed frame 10. Step 14 enables access to bed frame 10. The advantages of the present invention include, without limitation, conversion of cover 12 from a plurality of positions situate to bed frame 10 to a position generally above bed frame 10. Further, there exists the general advantage of generally joining together a bed-unit and mattress attachment 178 to another bed-unit thereby forming a joined bed-pairing. Further, there exists the general advantage such that covers 12 are generally joined, doors 244 farthest from their bed-unit's step 14 are in open positions and generally moved to a position above top of covers 470 and of which generally over-lap each other and doors 244 closest to their bed-unit's step 14 are in closed positions.

Referring now to the invention in more detail, in FIG. 5 and FIG. 6 there is shown bed frame 10 and cover 12, total square rod 606, as referenced in FIG. 55, and column with square cavity 336, as referenced in FIG. 14. Additionally there is shown separation door assembly 588, as referenced in FIG. 53, generally transitioning from a seated position, generally parallel to top lateral brace 28, to a closed position, generally perpendicular to top later brace 28.

Referring now to the invention in more detail, in FIG. 11 there is shown rod and box assembly 510 comprising of rod 44, adapter 50, receptacle 36 and receptacle frame 30. Rod 44 is generally securely fastened to adapter 50 as rod 44 is generally screwed into adapter 50. Adapter 50 is generally rigidly secured to receptacle 36 as threaded bolts are inserted completely through receptacle 36 and adaptor 50 with a nut securing each threaded bolt. Receptacle 36 is generally pivotally joined to receptacle frame 30 as receptacle pegs 38, as referenced in FIG. 9, are generally situated in receptacle frame slots 34, as referenced in FIG. 7, and generally enable receptacle 36 to pivot on the pair of load-bearing receptacle pegs 38 and enable the non-load bearing receptacle pegs 38 to generally pivot out of the receptacle frame slots 34 and outwards of receptacle frame 30.

Referring now to the invention in more detail, in FIG. 12 there is shown track assembly 76 which comprises of two frame roller boot tracks 78, four cover roller boot tracks 80, two track support joists 504, a middle track support joist 506, two track motor mounts 82 and two motorized telescoping push and pull devices 84. Frame roller boot track 78 is comprised of elongated rigid material with railings 508 extending generally upright on all sides of frame roller boot track 78. Cover roller boot tracks 80 are comprised of an elongated rigid material, shorter in length than that of frame roller boot track 78, with railings 508 extending generally upright on all sides of cover roller boot tracks 80. Two track railings 508 of cover roller boot tracks 80 are rigidly secured side-by-side to inside track railing 508 of each frame roller boot track 78. Separating the two cover roller boot tracks 80 is middle track support joist 506 which at either end of middle track support joist 506 is rigidly secured to track railing 508 at one end of cover roller boot track 80 and to track railing 508 on one side of frame roller boot track 78. Middle track support joist 506 is comprised of generally elongated and rigid material upon which are rigidly secured and generally centrally situated, two track motor mounts 82. Two motorized telescoping push and pull devices 84 are rigidly secured to the two track motor mounts 82 and at right angles to middle track support joist 506 and facing in opposite directions. Two track support joists 504, comprised of generally elongated rigid material, are rigidly secured at right angles to and generally nearer to the ends of cover roller boot track 80 which provide additional stability for track assembly 76. Generally and without limitation, each length, width and height of track assembly 76 is not limited to one dimension but of a plurality of dimensions. Generally and without limitation track assembly 76 is an optional component of the present invention and may not be a required component, for any reason whatsoever, of the present invention.

Referring now to the invention in more detail, in FIG. 13 there is shown the brace assembly with rod and box assembly comprising of brace assembly 512 and rod and box assembly 510. Rod and box assemblies 510 are generally loosely connected by receptacle frame pegs 32, as referenced in FIG. 7, within brace glide path 26 which enables box and rod assemblies 510 to move generally upwards and downwards generally within the length of brace glide path 26. Referring now to the invention in more detail, in FIG. 20 to FIG. 24 there is shown beam 114, columns 98, cross supports 122 and cross support plates 124. Cross supports 122 are inserted through slots 118 of beam 114 and over blocks 116. After insertion, cross support plates 124 are generally rigidly secured to the tops of cross support walls 130 at the opposite end of the previously rigidly secured cross support plates 124, as referenced in FIG. 19. Generally and without limitation, the combined apparatus of beam 114, columns 98, cross supports 122 and cross support plates 124 provide height uniformity when cross support plates are placed adjacent to the top of the flange of beam 114, a platform for mattress plate 90 and structure and stability for mattress plate 90.

Referring now to the invention in more detail, in FIG. 27 and FIG. 28 there is shown push-pull assembly 146 which is comprised of push-pull shaft 148 generally comprising of elongated rigid material with an approximate 45 degree slope at one end, a shaft guide 158, comprised of generally rigid material, generally extended in the middle of and from beneath the approximate 45 degree slope and rigidly secured to a one-piece leg assembly 492 comprising of a leg stand interior wall 152 and leg stand exterior wall 154, both connected by a block of rigid material and both of which are generally comprised of a plate made of rigid material with a plurality of leg pivot holes 156 cut through the total width of leg assembly 492 and of which push lever 150 comprising of elongated rigid material with a pivot mechanism situated in the middle of push lever 150 is generally connected to the outermost point of the approximate 45 degree slope of push-pull shaft 148. Generally and without limitation, when extended from cross support 122, push-pull shaft 148 provides a stable, uniform and even surface for a mattress to be placed upon mattress plate 90 of which push-pull shaft 148 supports. Generally and without limitation, each length, width and height of the components of push-pull assembly 146 are not limited to one dimension but of a plurality of dimensions. Generally and without limitation, push-pull assembly 146 is an optional component of the present invention and may not be a required component, for any reason whatsoever, of the present invention.

Referring now to the invention in more detail, in FIG. 29 to FIG. 32 there is shown mattress attachment assembly, with mattress attachment in closed position, FIG. 29, half-way position, FIG. 30 and upright position, FIG. 31, which comprises of beam 114, cross supports 122, scissor assembly 134, push-pull assembly 146, mattress attachment and mattress attachment plate and hanger assembly 180. The mattress attachment in the closed position generally means that the mattress attachment and mattress attachment plate and hanger assembly 180 is hanging generally below cross support 122. Inside scissor wall 140 of scissor assembly 134 is rigidly secured to the web of beam 114. Outside scissor wall 142 of scissor assembly 134 is rigidly secured to leg stand interior wall 152 of push-pull assembly 146. Outside scissor wall 142 of scissor assembly 134 is loosely secured to plate 168 of mattress attachment and mattress attachment plate and hanger assembly 180 generally by spring 266. Hanger wheels 162 of mattress attachment, mattress attachment plate and hanger assembly 180 are situate on wheel paths 126 of cross supports 122. When scissor motor 138 is activated, scissor bracing 136 expands causing leg stand interior walls 152 to generally shift along the underside of cross supports 122 and cause shaft guides 158, as referenced in FIG. 27, to generally shift along cross support guide-ways 132, as referenced in FIG. 19, and causes push levers 150 to push adjustable height blocks 172 of mattress attachment, mattress attachment plate and hanger assembly 180 underneath and along cross supports 122 such that mattress attachment, mattress attachment plate and hanger assembly 180 pivots generally upright such that the top of mattress attachment 176, the side opposite of plate 168, is generally adjacent, aligned with and uniformly even to the top of mattress 88, open position, and shaft guides 158 enters into and generally shifts along cross support guide-ways 132 of another adjacent bed-unit generally forming a joined bed-pairing Referring now to the invention in more detail, in FIG. 33 and FIG. 34 there is shown mattress platform group 86 which comprises of mattress platform 514 and rod and box assemblies 510. Mattress platform 514 is generally pivotally connected at each end by rods 44 as rods 44 are generally inserted through the entire length of cylindrical rod support holes 120, as referenced in FIG. 15, and the entire width of columns 98. Generally and without limitation, mattress platform group 86 is not limited to one size of mattress 88, as referenced in FIG. 26, but to a plurality of mattress sizes.

Referring now to the invention in more detail, in FIG. 35 there is shown door 244 which is generally loosely connected to right door guide assembly 542 of which bar gear 252 of right door guide assembly 542 generally pivots at upper roof guide-way 192 of cover frame 182. There is shown door 244 generally transitioning from a completely closed position, a generally upright position, to a roof-top position, a generally horizontal position.

Referring now to the invention in more detail, in FIG. 36 there is shown door 244 which is generally loosely connected to right door guide assembly 542 of which bar gear 252 of right door guide assembly 542 generally travels within and along the length of guide-way track 264 of upper roof guide 544 and seats into upper roof guide-way 192.

Referring now to the invention in more detail, in FIG. 37 there is shown cover 12 with doors 244 in an open position, generally stationed above roof assembly 194.

Referring now to the invention in more detail, in FIG. 38 there is shown cover 12 with one door 244 in an open position and the other door 244 in a closed position.

Referring now to the invention in more detail, in FIG. 39 there is shown cylindrical disk 204 comprising of generally cylindrical rigid material with glide path 206, generally an elongated upright cavity cut through the middle of cylindrical disk 204. Generally and without limitation, each length, width, height and circumference of cylindrical disk 204 is not limited to one dimension but of a plurality of dimensions. Generally and without limitation, cylindrical disk 204 is an optional component of the present invention and may not be a required component, for any reason whatsoever, of the present invention.

Referring now to the invention in more detail, in FIG. 40 and FIG. 41 there is shown cover end assembly 184 comprising of outside plate 202 rigidly secured to cylindrical disk 204 of which cylindrical disk 204 is rigidly secured to inside plate 208 such that glide path 206 of outside plate 202 and glide path 206 of cylindrical disk 204 and glide path 206 of inside plate 208 are all generally aligned with each other.

Referring now to the invention in more detail, in FIG. 43 and FIG. 44 there is shown cover frame 182, inside plate 208, rod 44, glide path door 222, glide path door hanging assembly 224, pulley motor 576, pulley cable, 580 and pulley 578. Upon activation of pulley motor 576 of which pulley cable 580 is generally secured to, pulley cable 580 generally moves clockwise or counter-clockwise through pulleys 578 causing rolling track assembly 226 of which clasp 228, as referenced in FIG. 42, is generally secured to pulley cable 580 to generally move along hanging assembly track 530 which causes glide path door 222 to generally move back from a position over rod 44 exposing glide path 206, as illustrated in FIG. 43, and generally forth to a position over rod 44 covering glide path 206, as illustrated in FIG. 44. Generally and without limitation, glide path door 222, when covering glide path 206, inhibits noise, light, temperature, pathogens and air transmission through cover 12 and provides additional structural integrity to cover 12 when generally joined to rod 44 as glide path door 222 is situate between cover frame lateral brace 524 and rod 44. Alternate motor assemblies may be obvious to one of ordinary skill in the art and thus the present invention is not limited to the preferred embodiment, pulley motor 576, but of a plurality of types of motor assemblies.

Referring now to the invention in more detail, in FIG. 47 there is shown right door guide assembly 542 and door 244.

Door 244 is generally loosely connected to right door assembly 542 as door latch disk 534 of door latch 256 generally slides within door grip guide-way 532 of door grip 248, as referenced in FIG. 45.

Referring now to the invention in more detail, in FIG. 48 there is shown lower roof guide 262 rigidly secured at each end to cover frame 182 such that each end is generally aligned with lower roof guide-way 190. There is also shown upper roof guide 544 rigidly secured at each end to cover frame 182 such that each end is generally aligned with upper roof guide-way 192.

FIG. 51 illustrates mattress attachment 176 in an open position and push-pull assembly 146 extended, as referenced in FIG. 29 to FIG. 32.

FIG. 52 illustrates generally joining the bed-units of the bed-pairing. Upon activation of motorized telescoping push-pull devices 84, motorized telescoping push-pull devices 84, of which are generally rigidly secured to track motor mounts 82 of which are generally rigidly secured to middle track support joist 506 of track assembly 76, generally pulls braces 24 of bed frames 10, of which motorized telescoping push-pull devices 84 are generally rigidly secured to and step 14 of which step 14 is generally rigidly secured to brace 24 of bed frame 10 generally along frame roller boot track 78 of track assembly 76 and cover roller boot assemblies 566, which are situated within and generally rigidly secured to braces 24, generally along cover roller boot track 80 of track assembly 76, generally toward middle track support joist 506. Push-pull assembly 146 is extended into cross support 122 of the left-side bed-unit.

Referring now to the invention in more detail, in FIG. 54 there is shown cover 12, motorized lifting device groups 56 and cover motor assemblies 568. Motorized lifting device group 56 and cover motor assembly 568 enable cover 12 to move generally upwards and generally move downwards and to generally rotate up to 360 degrees generally clockwise or generally counter-clockwise around rod 44. Cylindrical disk 204 of cover 12 is generally loosely connected to rotational tread 574 of cover motor assembly 568 of which cover motor assembly 568 is generally rigidly secured to the top of lift plate 58 of motorized lifting device group 56. Upon activation of motorized lifting device group 56, rotational tread 574 and cover 12 generally move in an upward direction and generally move in a downward direction. Upon activation of chain motor 570, gear chain 572 begins to rotate which generally causes rotational tread 574, of which rotational tread 574 is rigidly secured to the top of lift plate 58 and generally loosely connected to cylindrical disk 204, to rotate, which causes cylindrical disk 204 to rotate generally clockwise or generally counter-clockwise around rod 44. Alternate motor assemblies may be obvious to one of ordinary skill in the art and thus the present invention is not limited to the preferred embodiment, cover motor assembly 568, but of a plurality of motor assemblies.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

BRIEF DESCRIPTION OF THE DRAWINGS

FIG. 43 is a front elevation view of the cover, glide path door hanging assembly, glide path door and pulley motor assembly of the present invention;

FIG. 44 is a front elevation view of the cover, glide path door hanging assembly, glide path door and pulley motor assembly of the present invention;

BEST MODES FOR CARRYING OUT THE INVENTION

Figure 1:
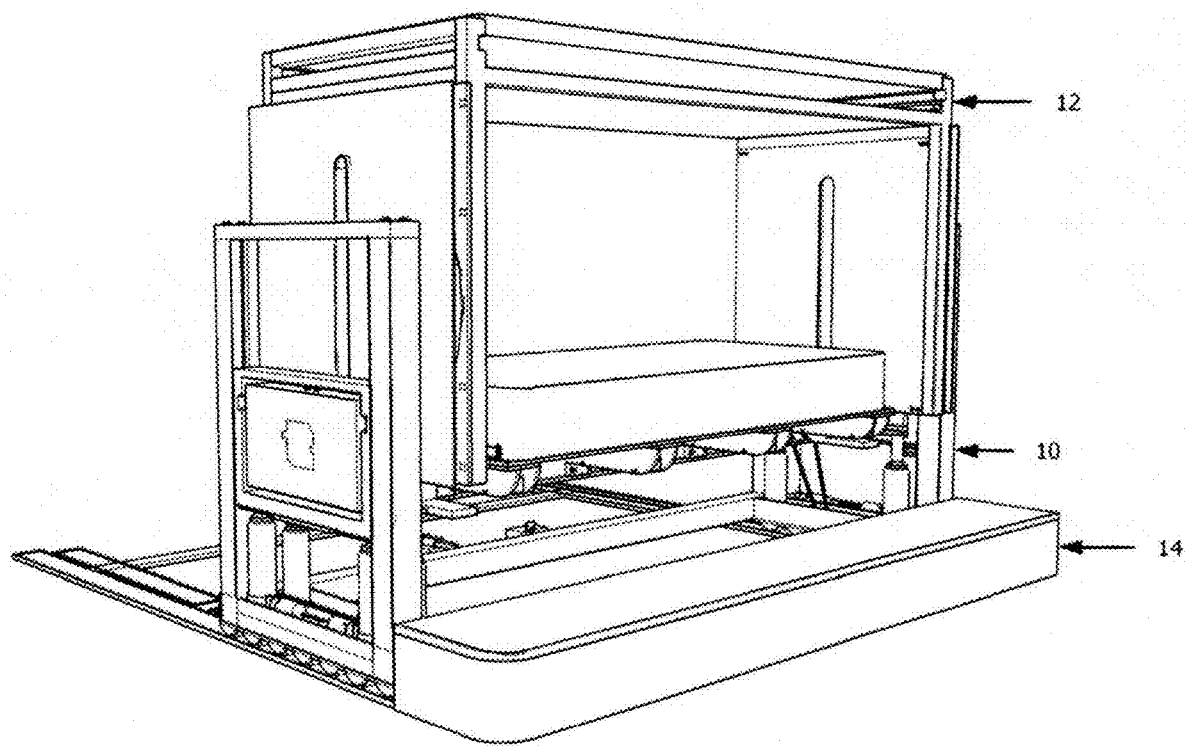
FIG. 1 is a perspective view of the present invention comprising of the bed frame, independent and optional cover, and step.
Figure 2:
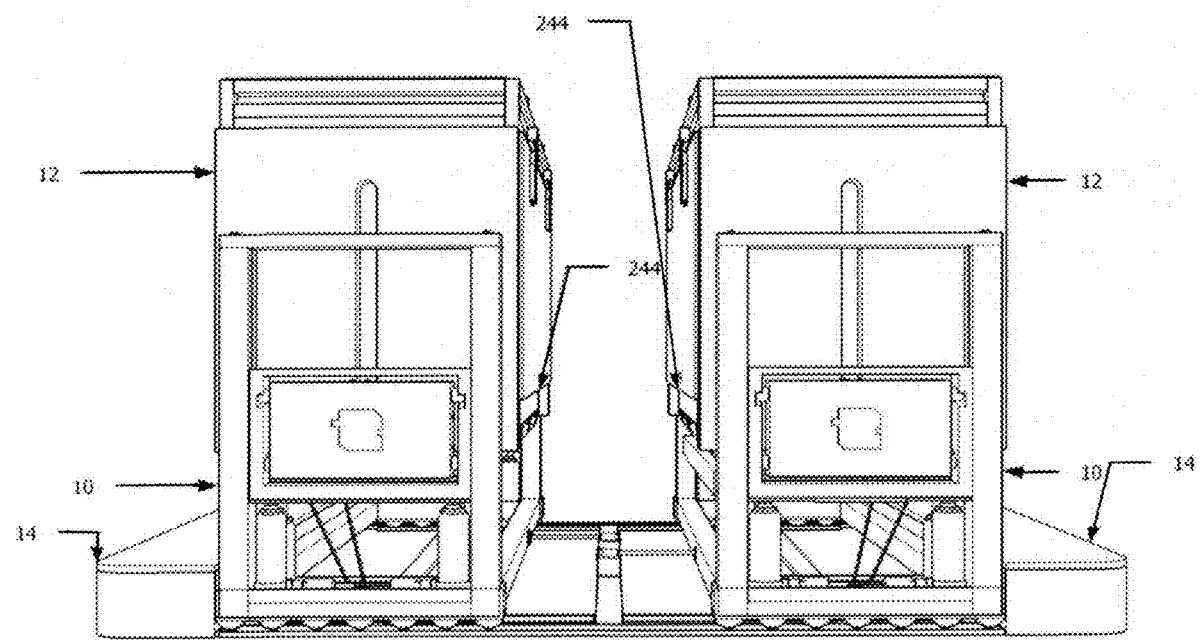
FIG. 2 is a front elevation view of the present invention comprising of the bed frame, independent and optional cover, and step beside another bed frame, independent and optional cover, step, and which together form a bed-pairing.
Figure 3:
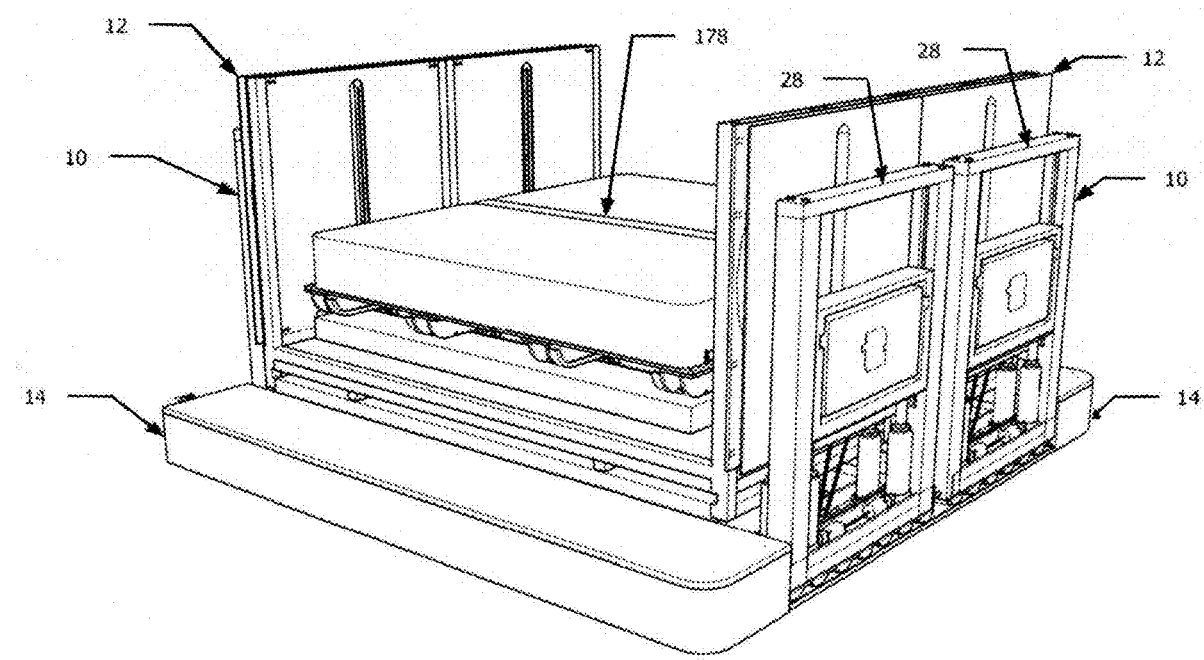
FIG. 3 is a perspective view of the present invention comprising of the bed frame, independent and optional cover, and step beside another bed frame, independent and optional cover, step, and which together form a joined bed-pairing.
Figure 4:
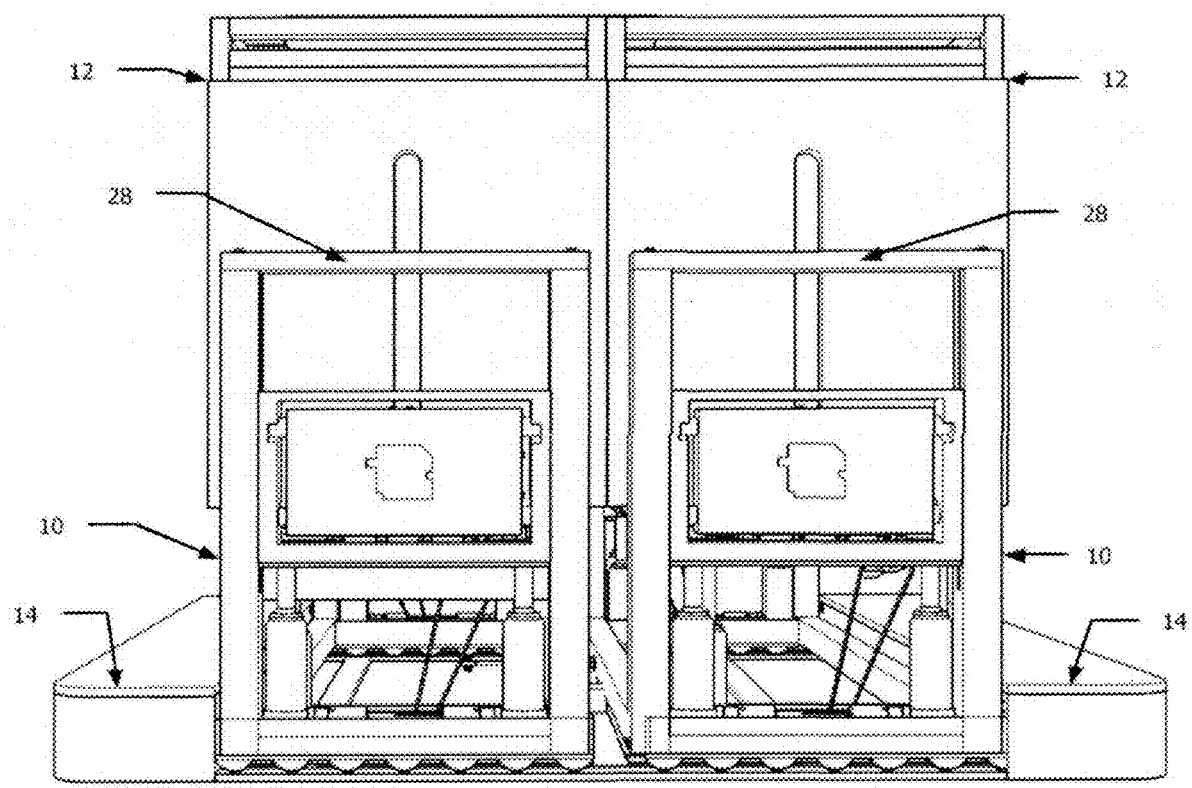
FIG. 4 is a front elevation view of the present invention comprising of the bed frame, independent and optional cover, and step beside another bed frame, independent and optional cover, step which together form a bed-pairing.
Figure 5:
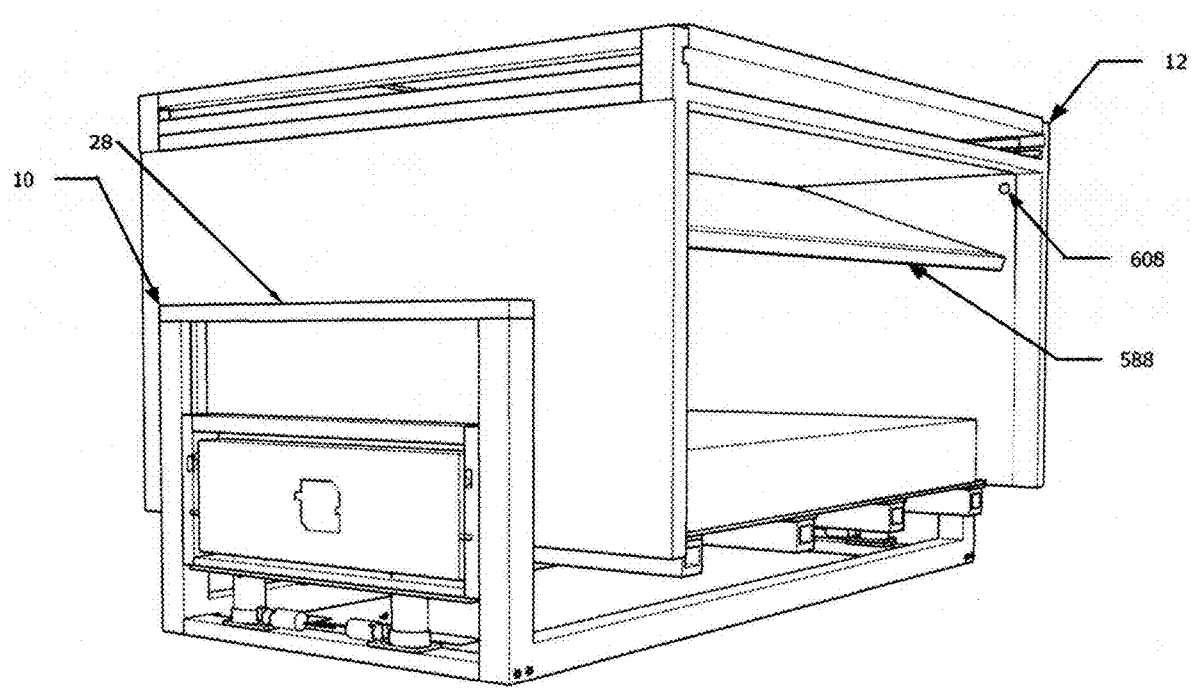
FIG. 5 is a perspective view of the bed frame and independent and optional cover of the present invention.
Figure 6:
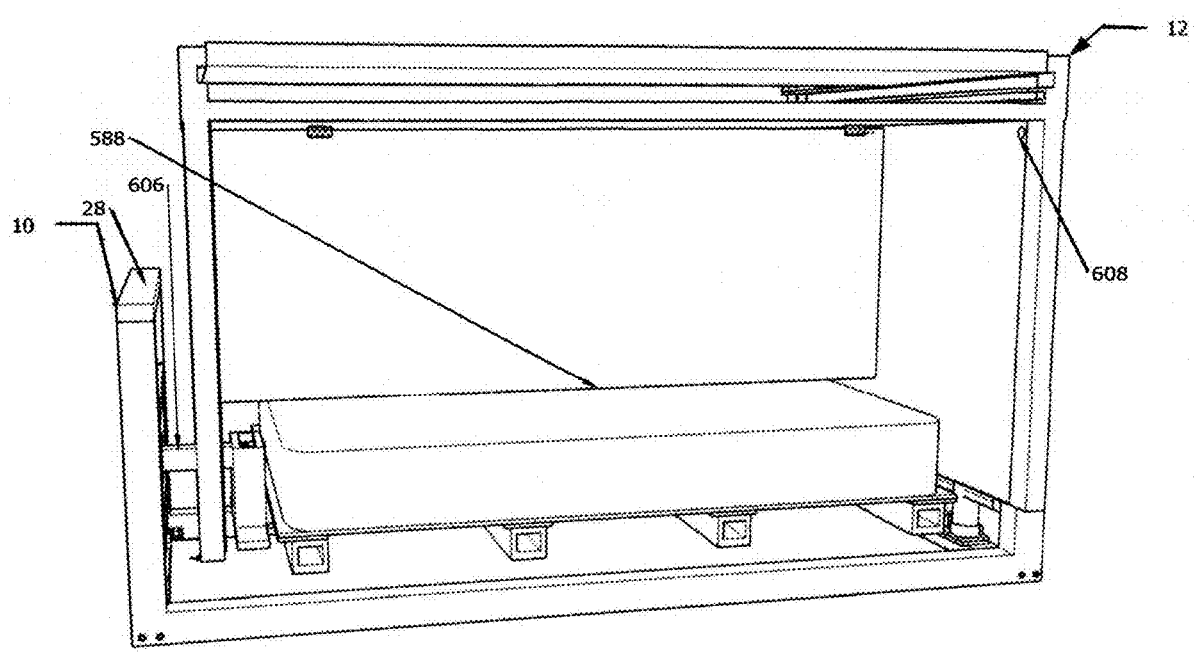
FIG. 6 is a perspective view of the bed frame and independent and optional cover of the present invention.
Figure 7:
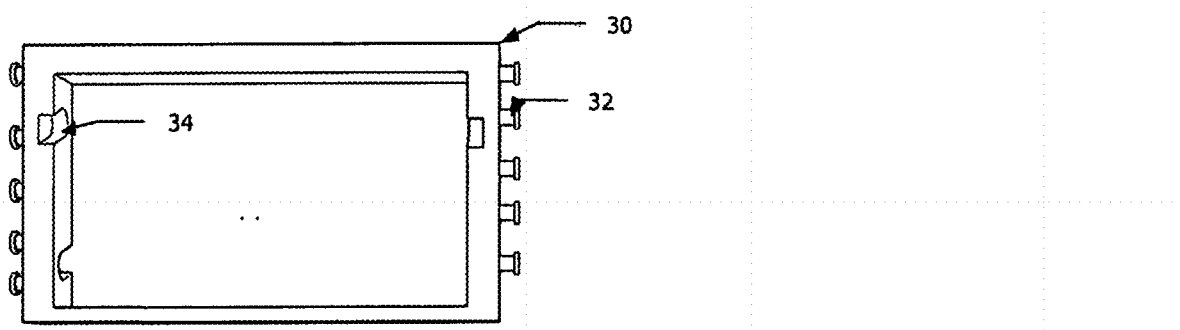
FIG. 7 is a front elevation view of the receptacle frame of the present invention.
Figure 8:
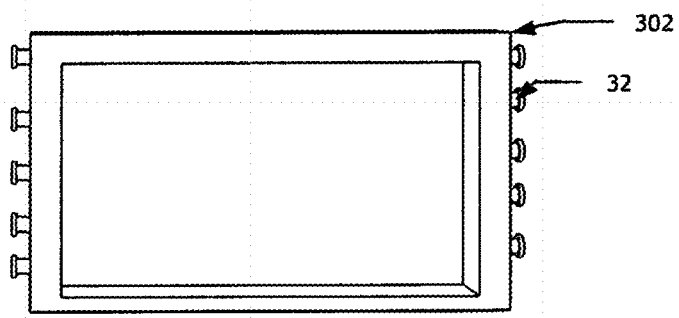
FIG. 8 is a front elevation view of the alternate embodiment receptacle frame.
Figure 9:
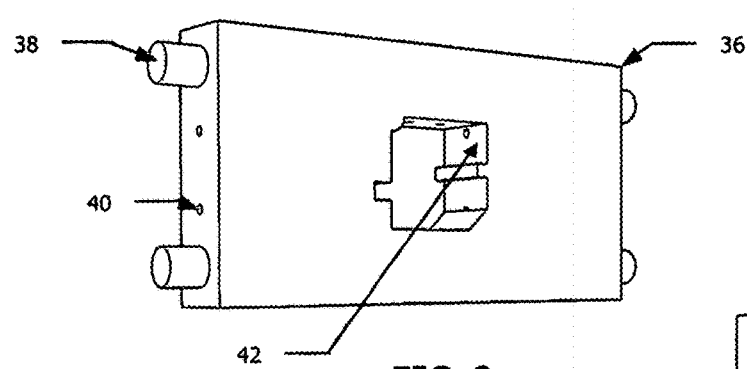
FIG. 9 is a perspective view of the receptacle of the present invention.
Figure 10:
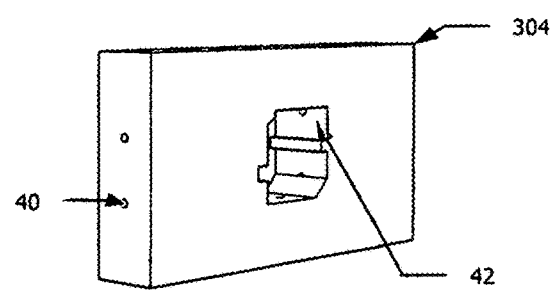
FIG. 10 is a perspective view of an alternate embodiment of the receptacle.
Figure 11:
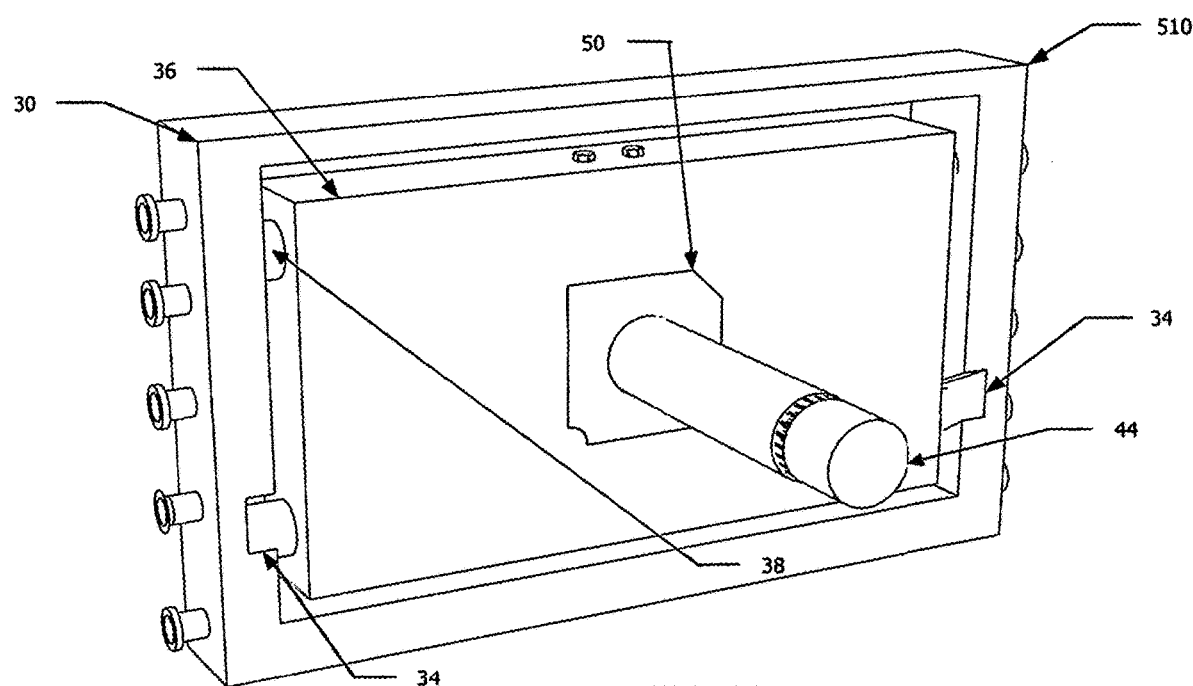
FIG. 11 is a perspective view of the rod and box assembly of the present invention.
Figure 12:
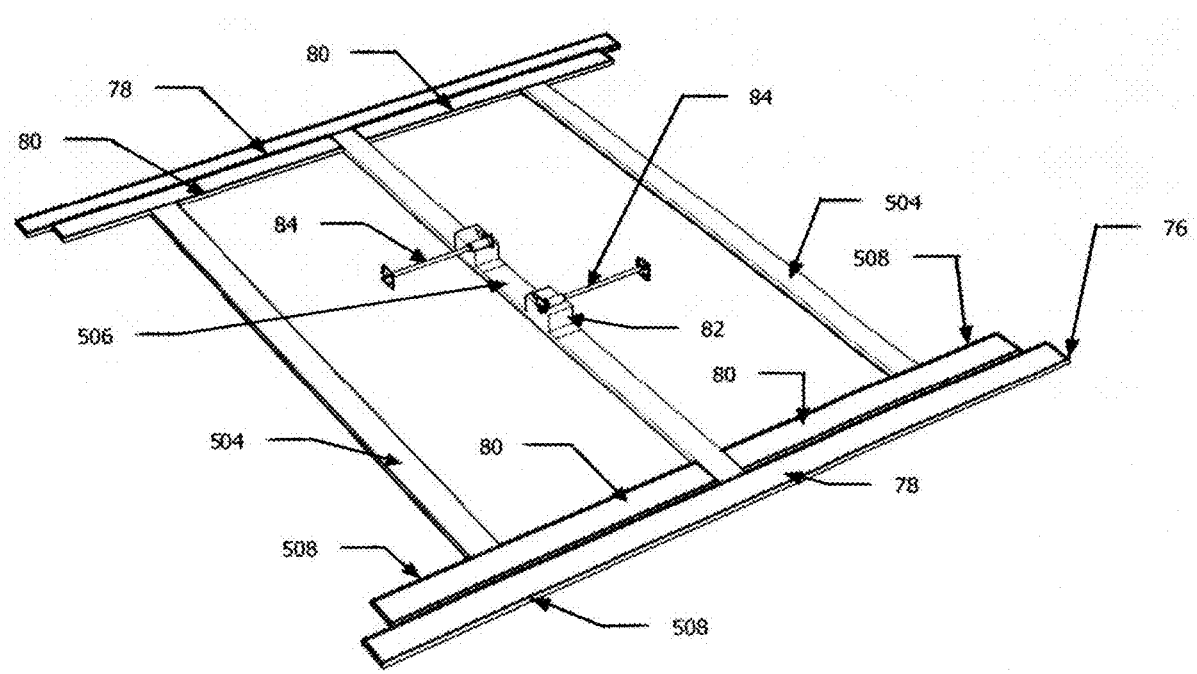
FIG. 12 is a perspective view of the track assembly of the present invention.
Figure 13:
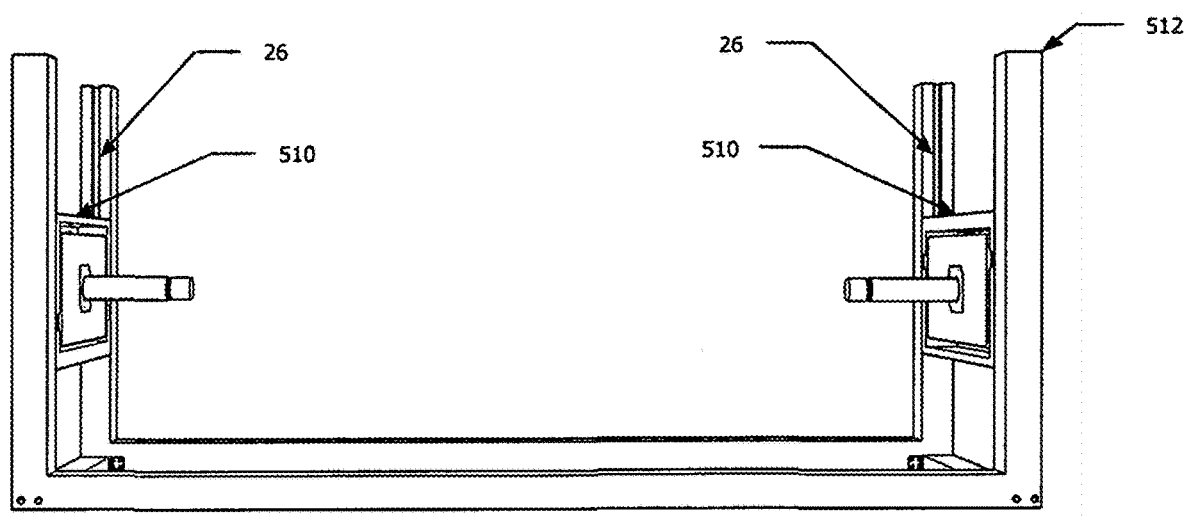
FIG. 13 is a right side elevation view of the brace assembly and rod and box assemblies of the present invention.
Figure 14:
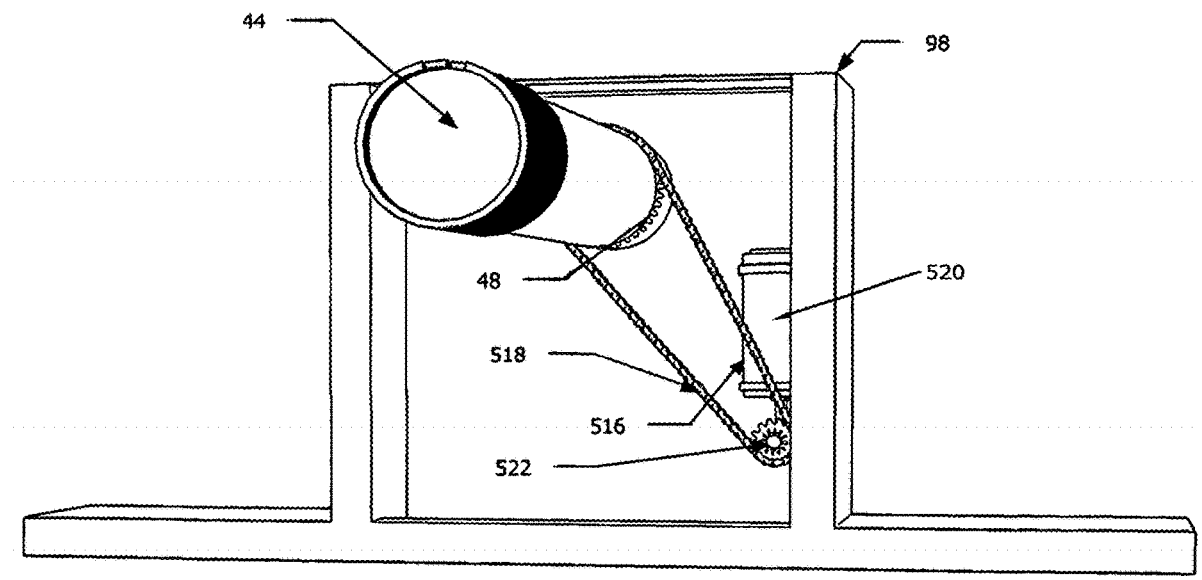
FIG. 14 is a perspective view of the column and column tilt motor assembly of the present invention.
Figure 15:
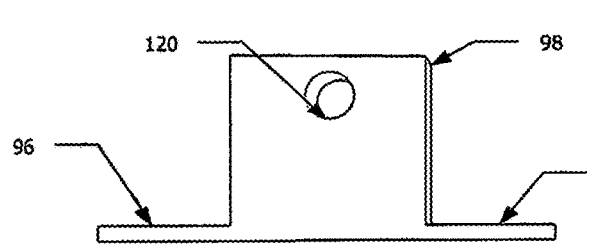
FIG. 15 is a front side elevation view of the column of the present invention.
Figure 16:
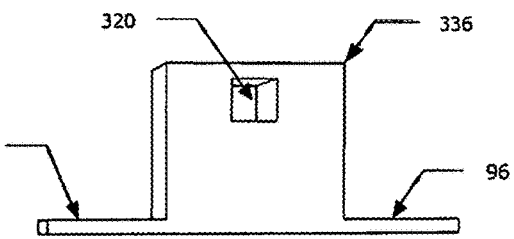
FIG. 16 is a front elevation view of an alternate embodiment of the column.
Figure 17:
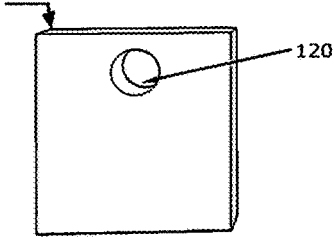
FIG. 17 is a front elevation view of an alternate embodiment of the column.
Figure 18:
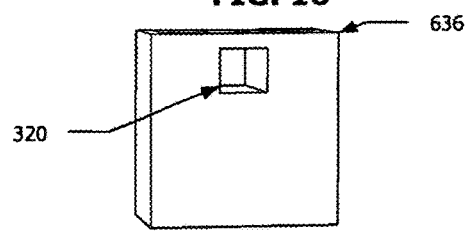
FIG. 18 is a front elevation view of an alternate embodiment of the column.
Figure 19:
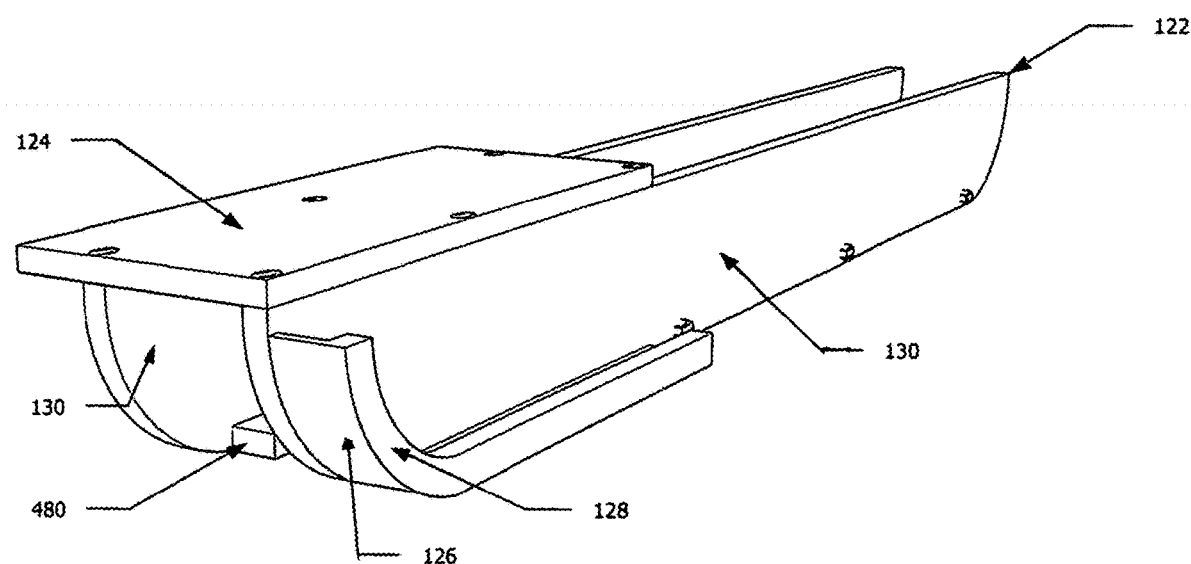
FIG. 19 is a perspective view of the cross support of the present invention.
Figure 20:
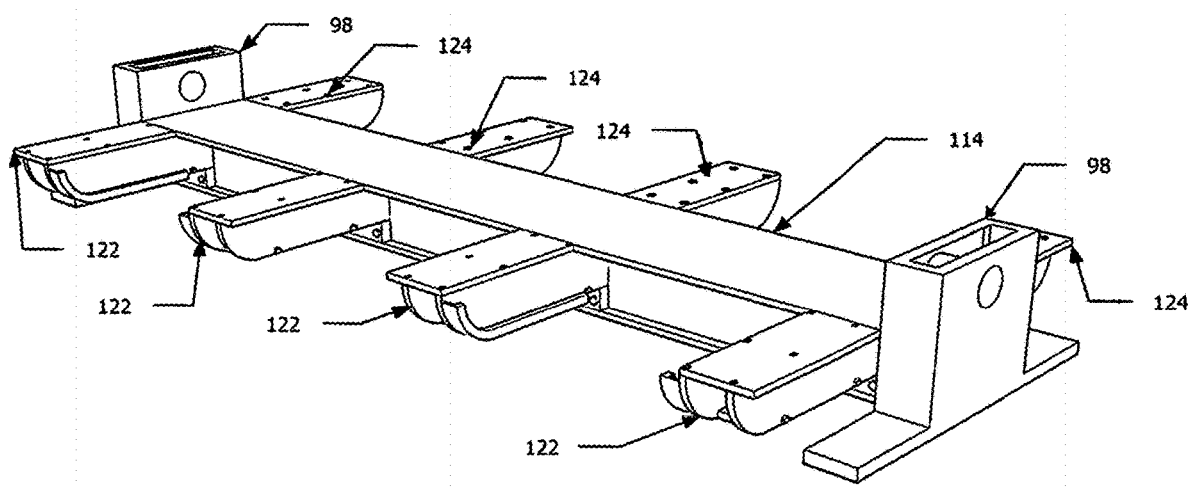
FIG. 20 is a perspective view of the beam, column and cross supports of the present invention.
Figure 21:
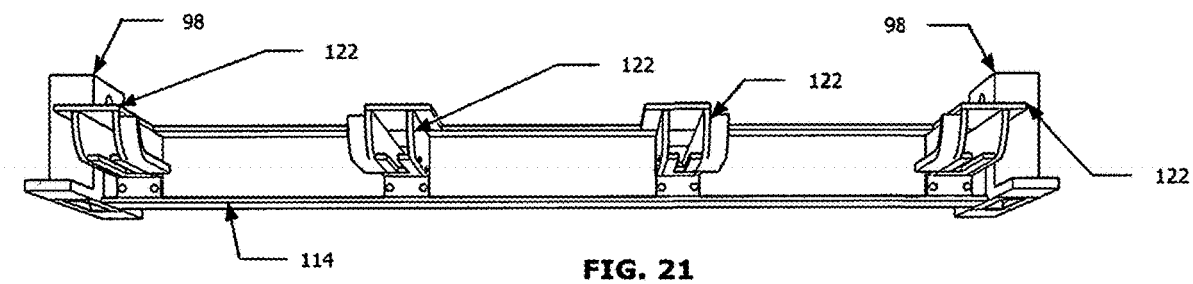
FIG. 21 is a right side elevation view of the beam, column and cross supports of the present invention.
Figure 22:
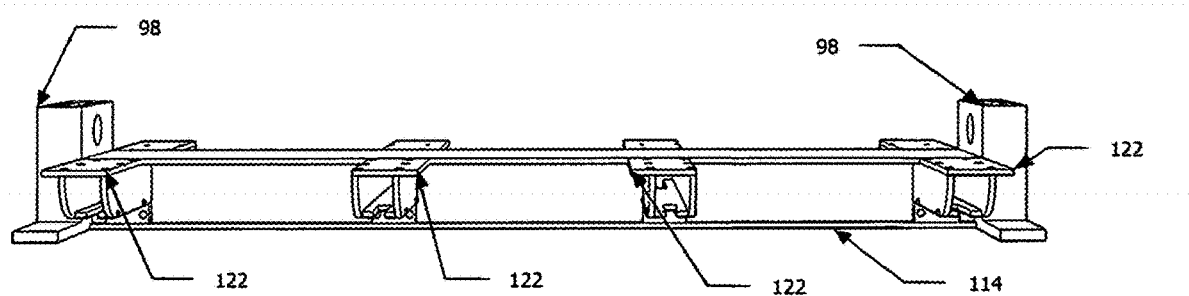
FIG. 22 is a left side elevation view of the beam, column and cross supports of the present invention.
Figure 23:
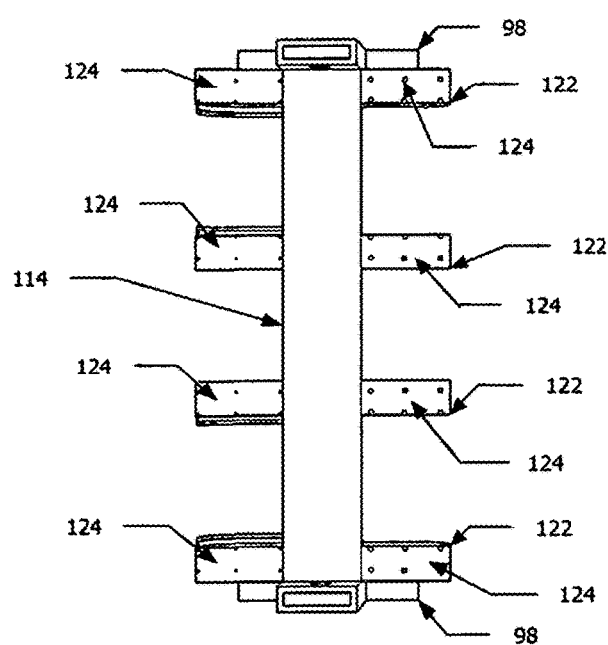
FIG. 23 is a top plan view of the beam, column and cross supports of the present invention.
Figure 24:
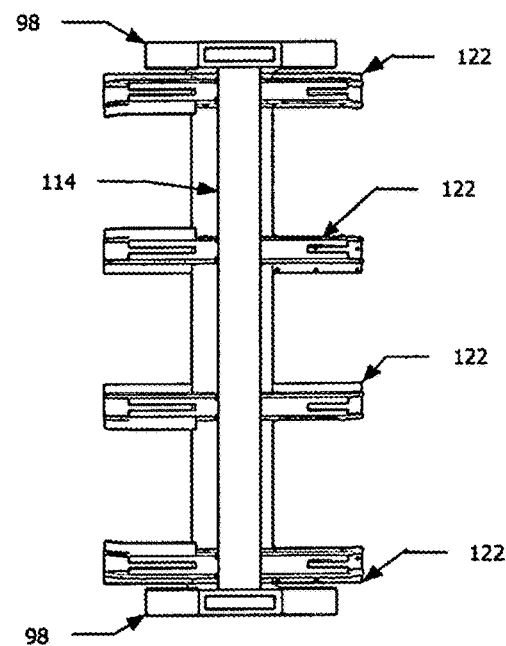
FIG. 24 is a bottom plan view of the beam, column and cross supports of the present invention.
Figures 25, 26:
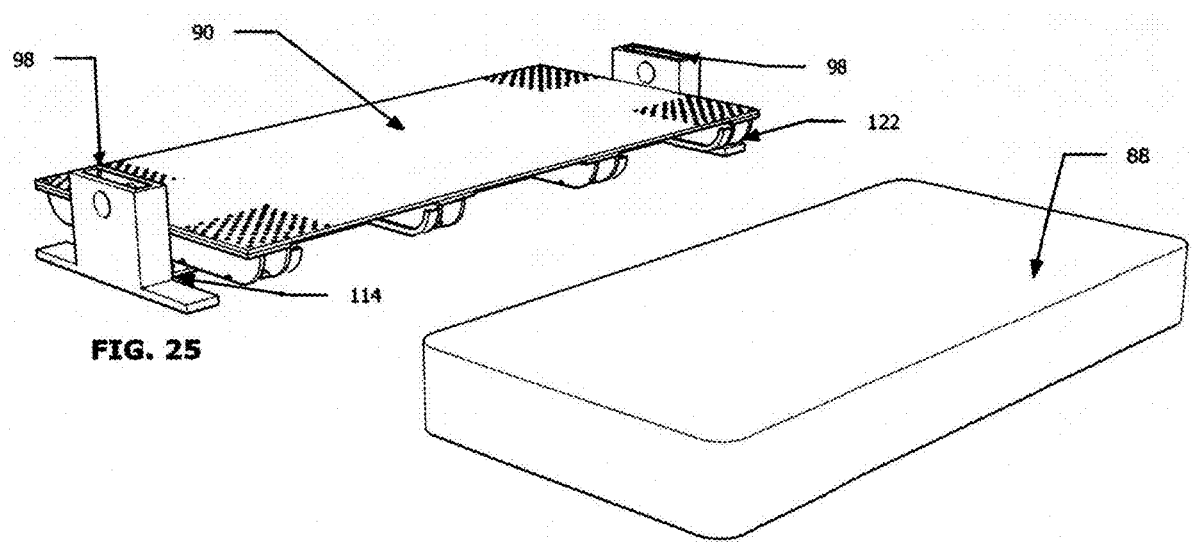
FIG. 25 is a perspective view of the beam, columns, cross supports and mattress plate of the present invention.
FIG. 26 is a perspective view of the mattress of the present invention.
Figure 27:
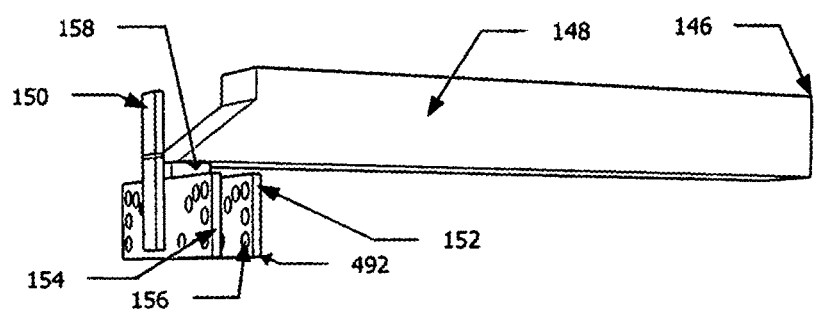
FIG. 27 is a perspective view of the push-pull assembly of the present invention.
Figure 28:
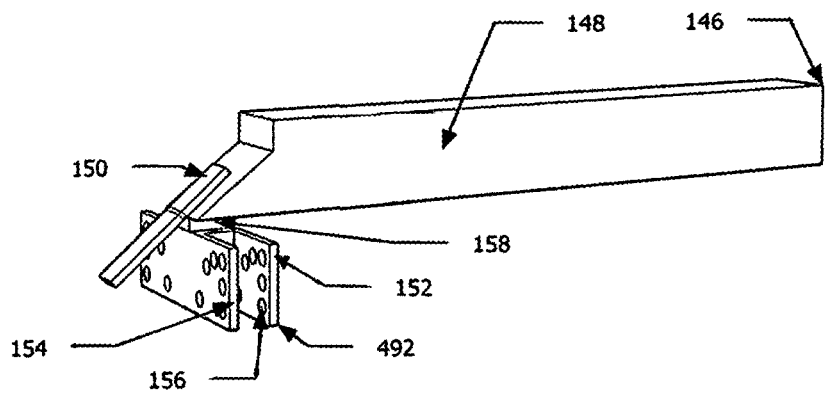
FIG. 28 is a perspective view of the push-pull assembly of the present invention.
Figure 29:
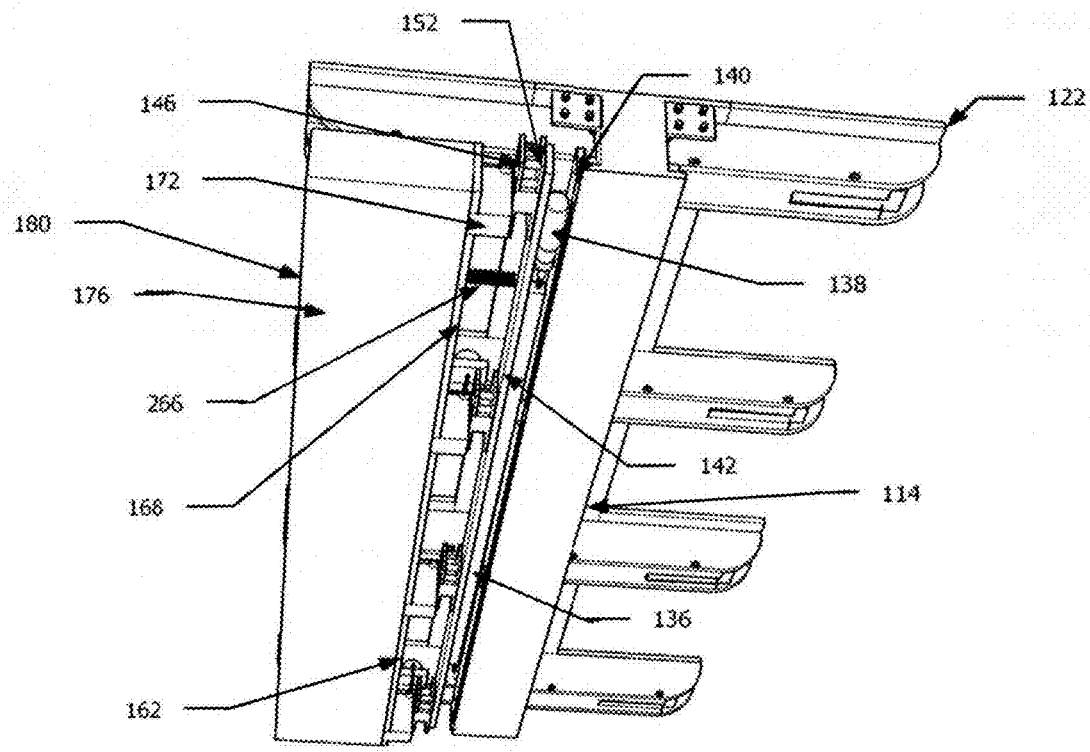
FIG. 29 is a perspective view of the mattress attachment assembly of the present invention.
Figure 30:
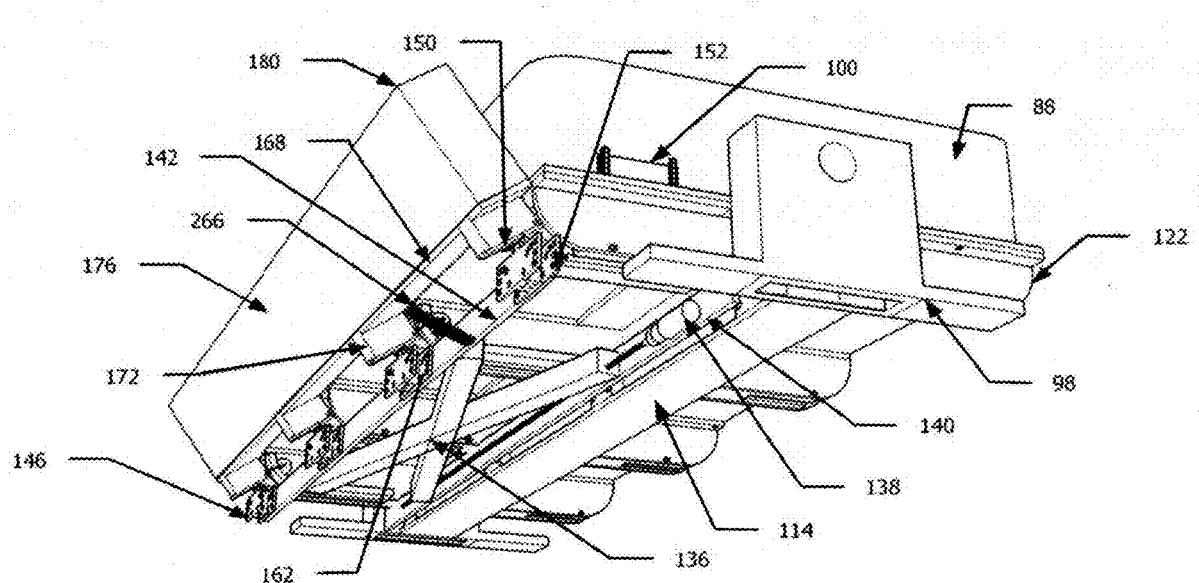
FIG. 30 is a perspective view of the mattress attachment assembly of the present invention.
Figure 31:
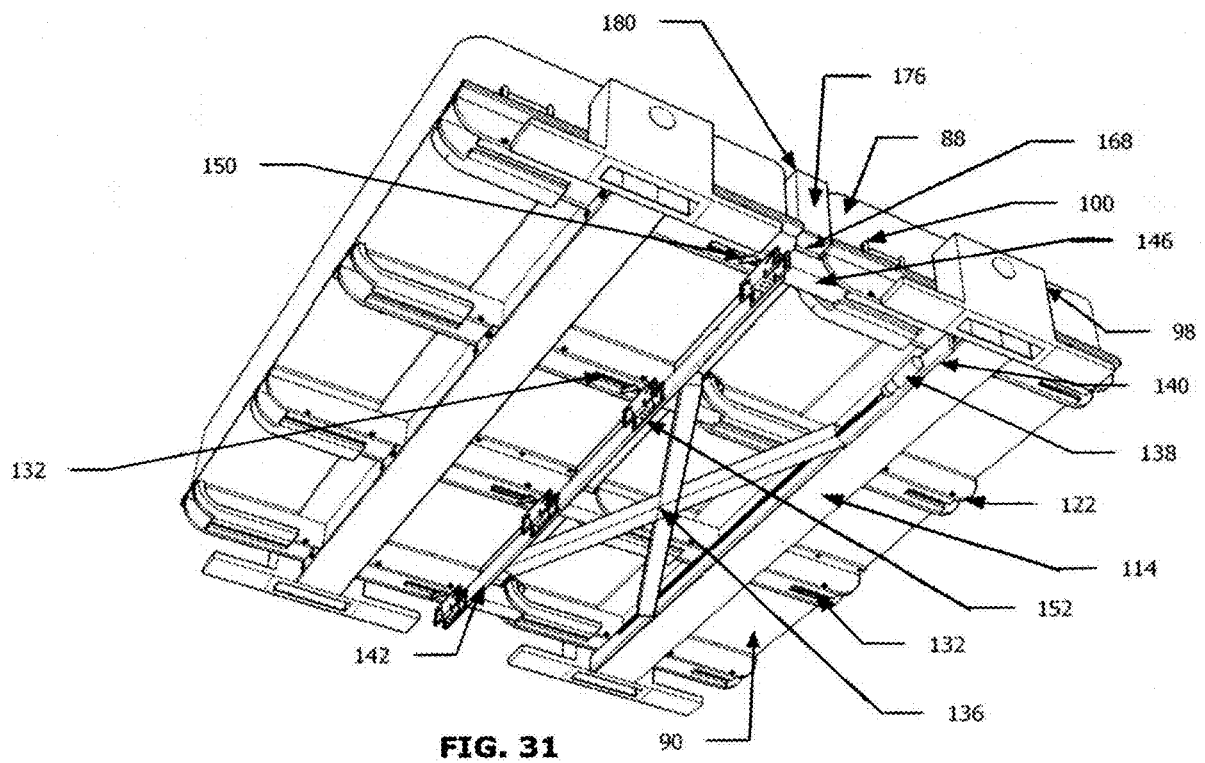
FIG. 31 is a perspective view of the mattress attachment assembly of the present invention.
Figure 32:
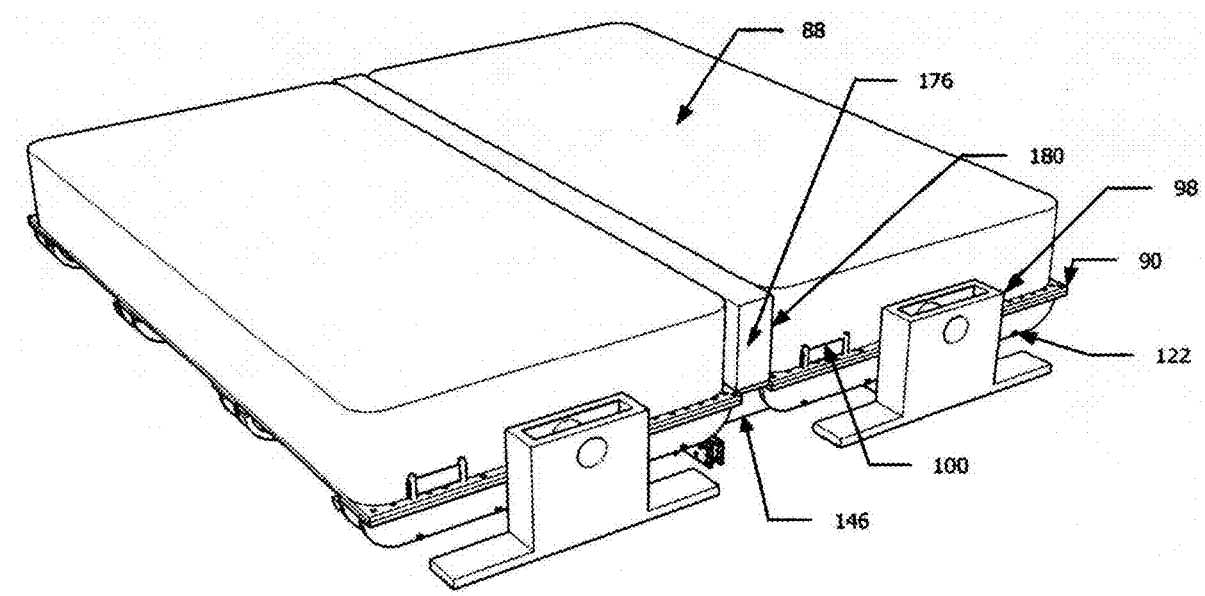
FIG. 32 is a perspective view of the mattress attachment assembly of the present invention.
Figure 33:
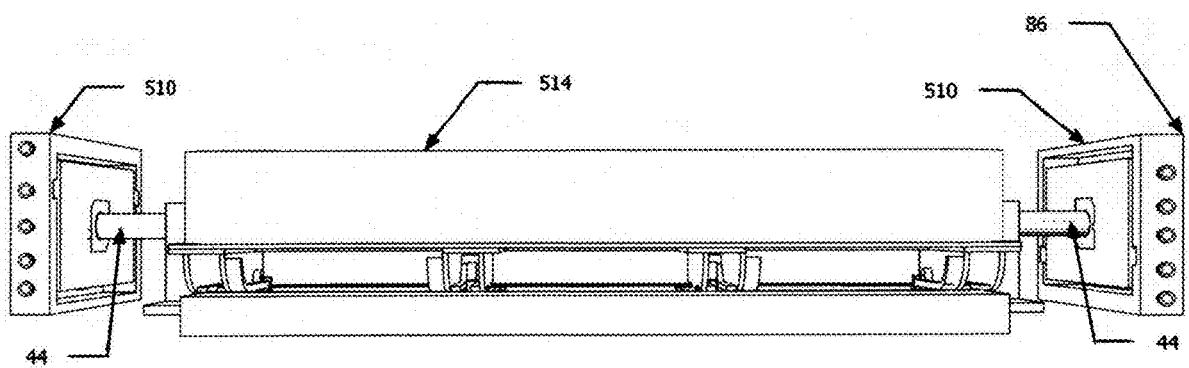
FIG. 33 is a right side elevation view of the mattress platform group of the present invention.
Figure 34:
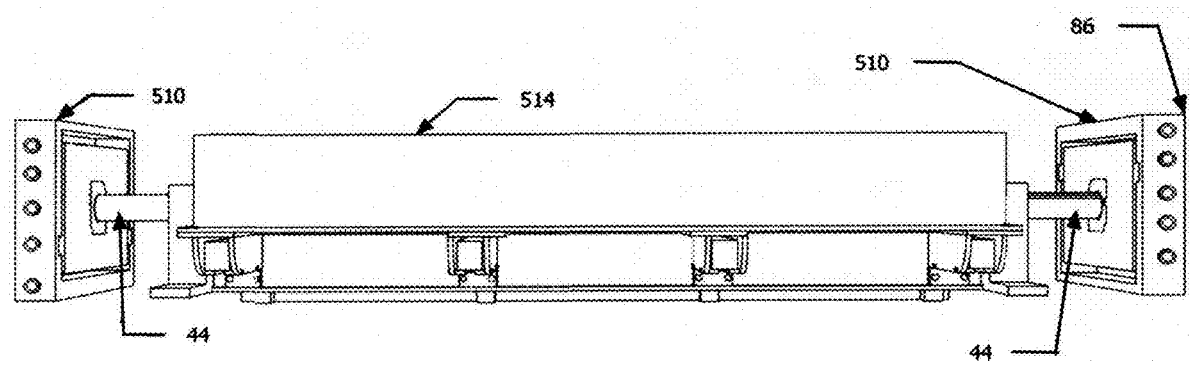
FIG. 34 is a left side elevation view of the mattress platform group of the present invention.
Figures 35, 36:
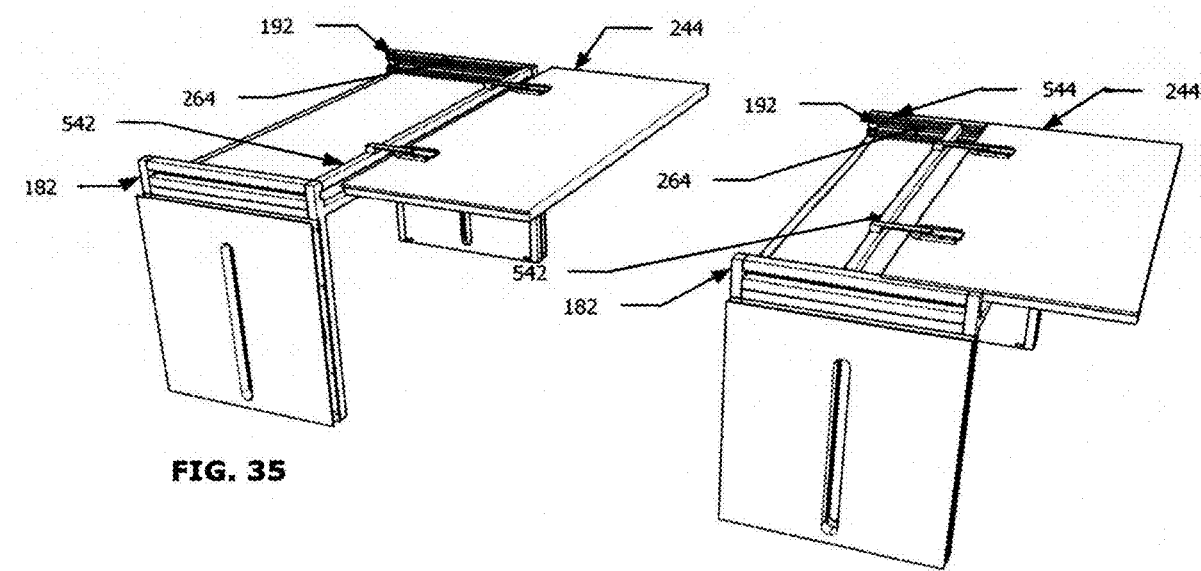
FIG. 35 is a perspective view of the cover of the present invention.
FIG. 36 is a perspective view of the cover of the present invention.
Figure 37:
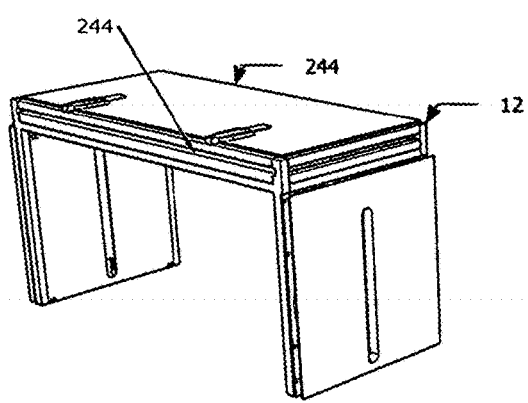
FIG. 37 is a perspective view of the cover of the present invention.
Figure 38:
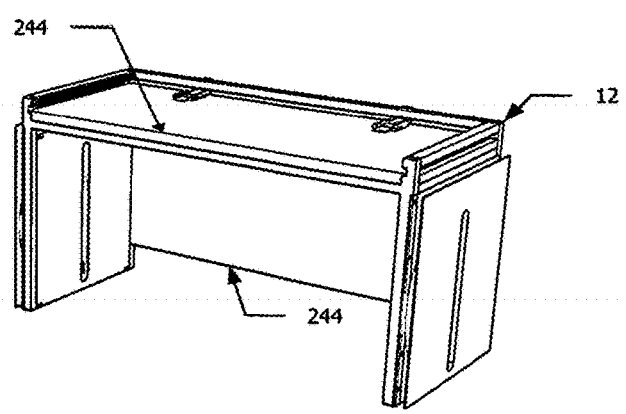
FIG. 38 is a perspective view of the cover of the present invention.
Figure 39:
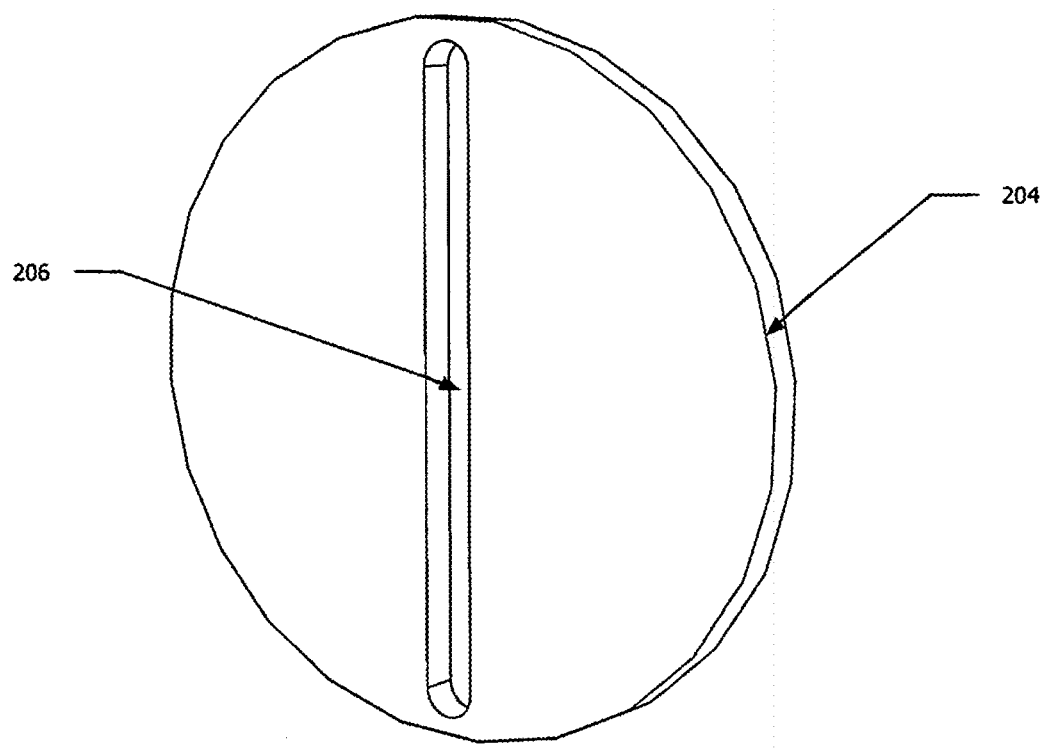
FIG. 39 is a perspective view of the cylindrical disk of the present invention.
Figure 40:
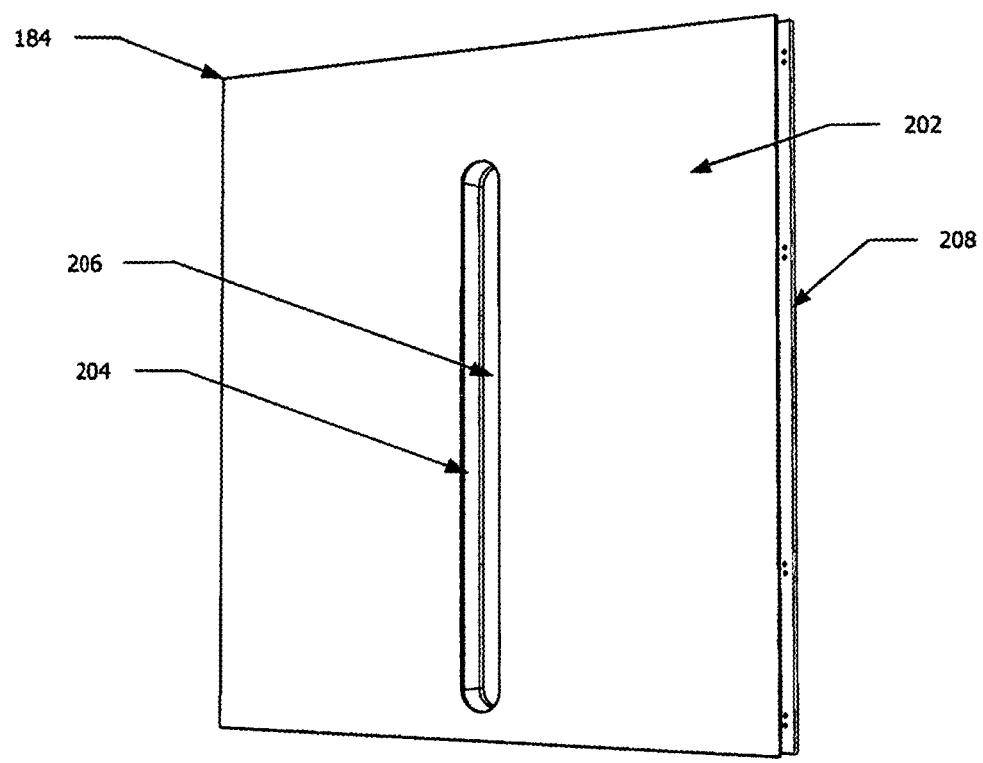
FIG. 40 is a perspective view of the cover end assembly of the present invention.
Figure 41:
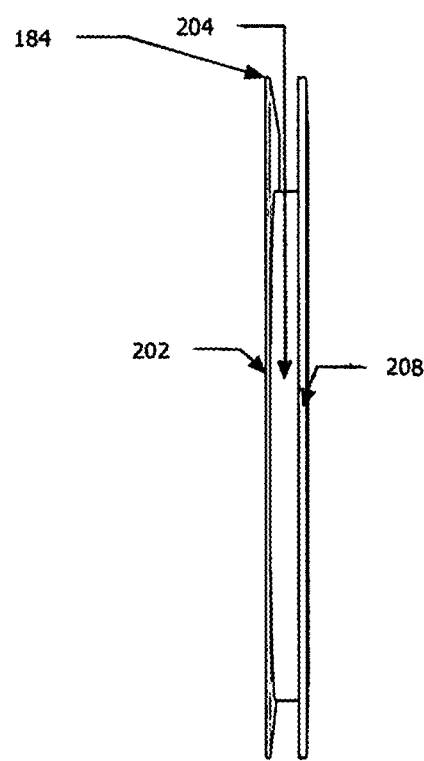
FIG. 41 is a right side elevation view of the cover end assembly of the present invention.
Figure 42:
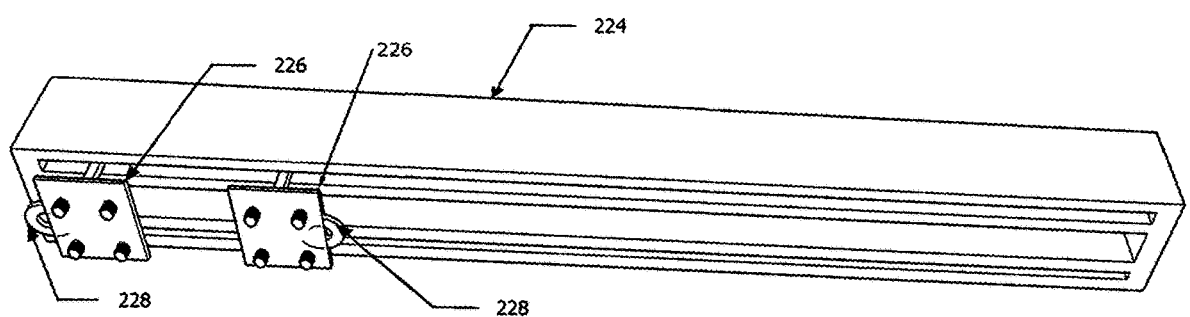
FIG. 42 is a perspective view of the glide path door hanging assembly of the present invention.
Figure 45:
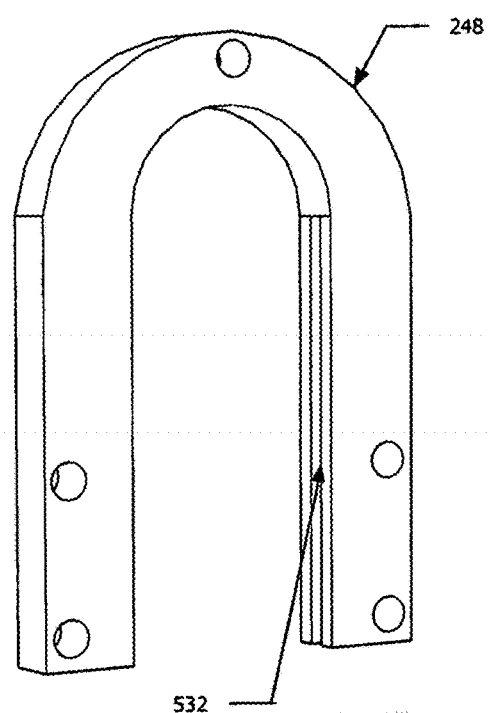
FIG. 45 is a perspective view of the door grip of the present invention.
Figure 46:
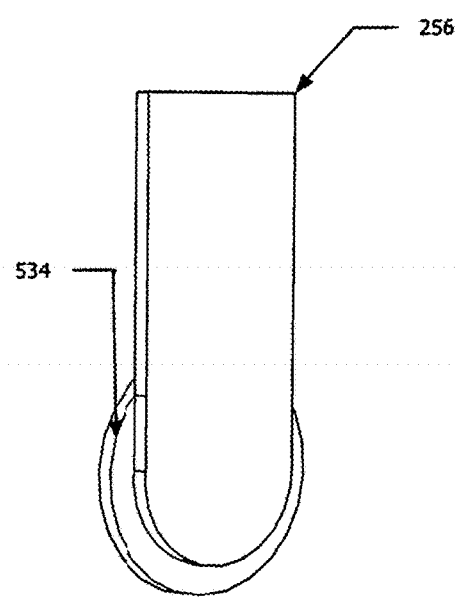
FIG. 46 is a perspective view of the door latch of the present invention.
Figure 47:
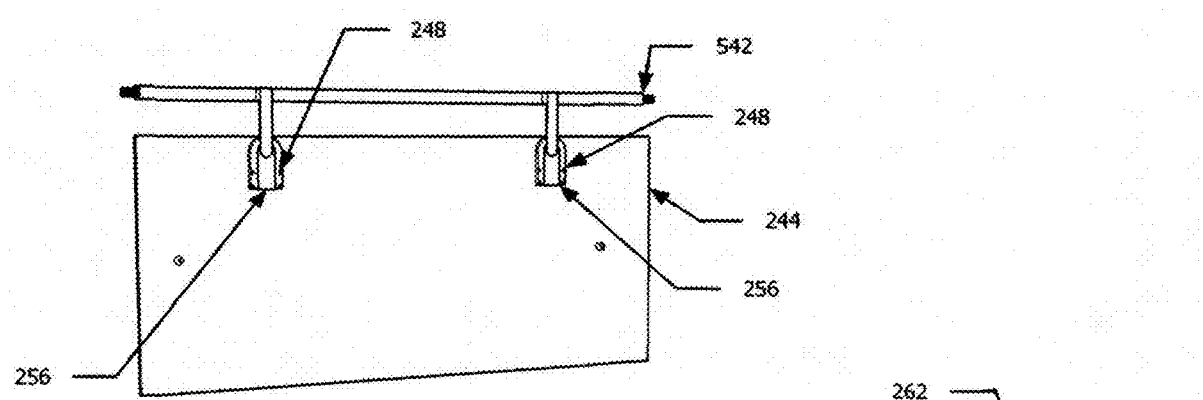
FIG. 47 is a perspective view of the door and right door guide assembly of the present invention.
Figure 48:
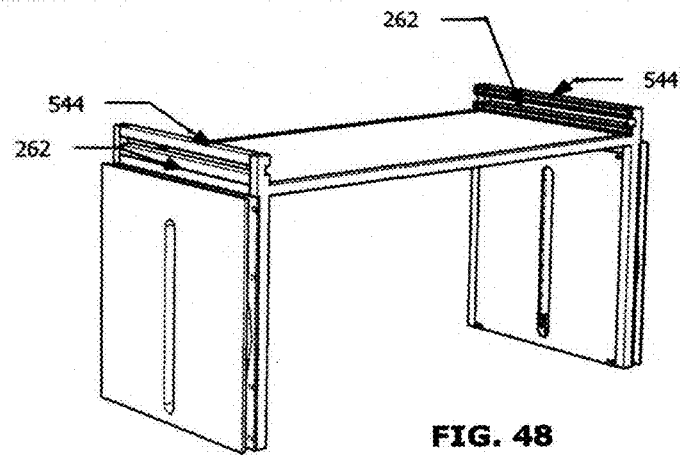
FIG. 48 is a perspective view of the cover, door and right door guide assembly of the present invention.
Figure 49:
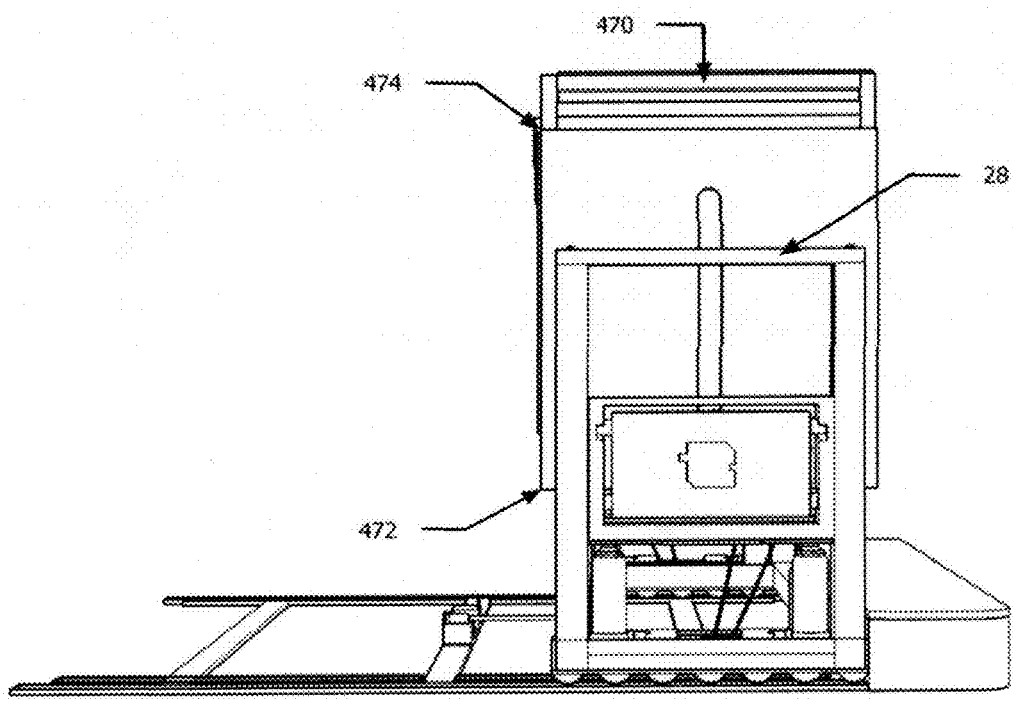
FIG. 49 is a front elevation view of the character and aspects of the cover.
Figure 50:
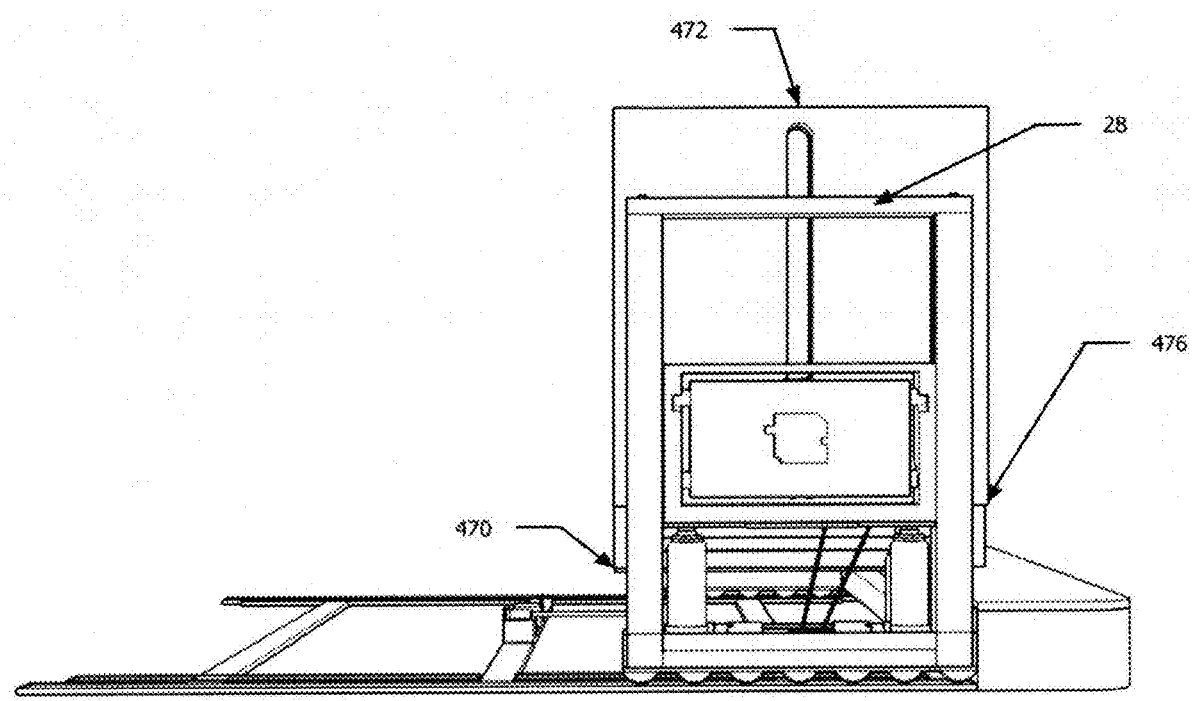
FIG. 50 is a front elevation view of the character and aspects of the cover.
Figure 51:
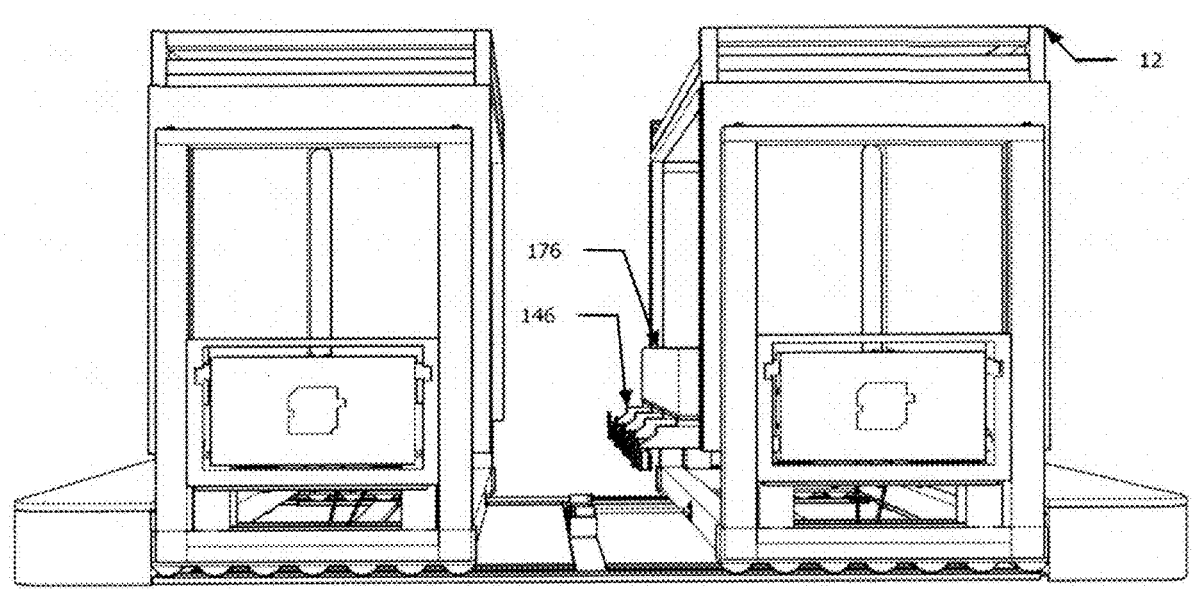
FIG. 51 is a front view of the bed-pairing of the present invention.
Figure 52:
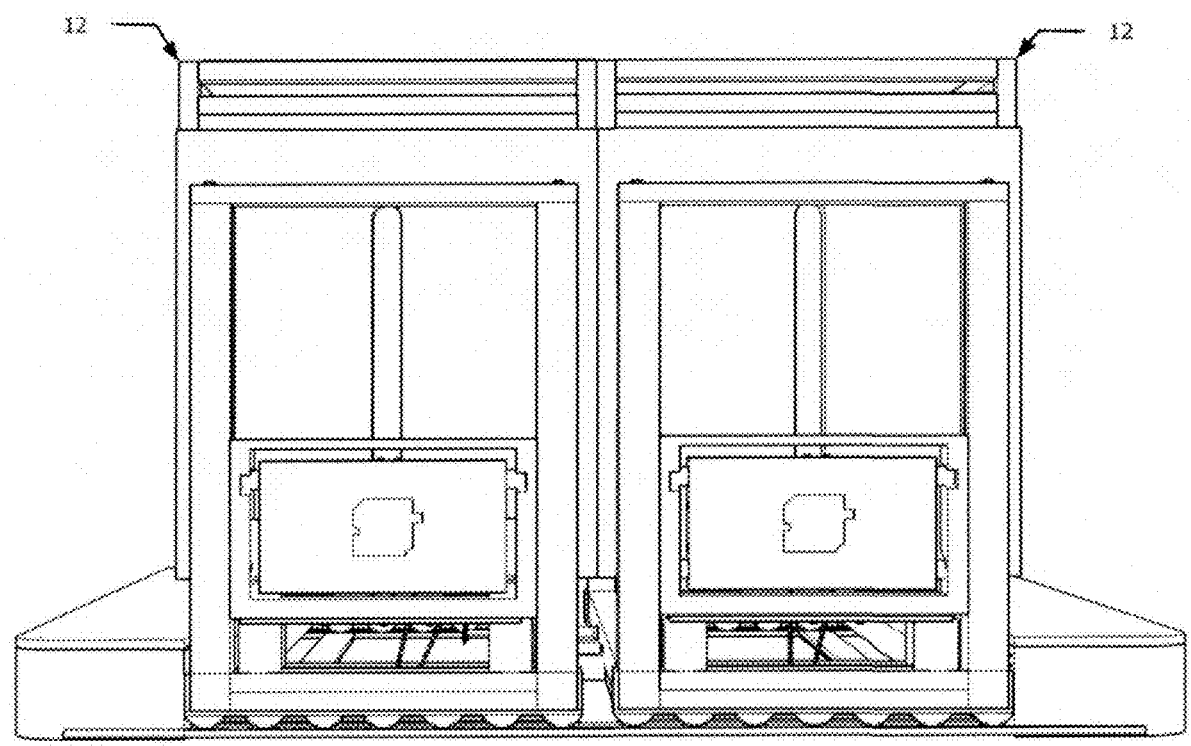
FIG. 52 is a front elevation view of the bed-pairing of the present invention.
Figure 53:
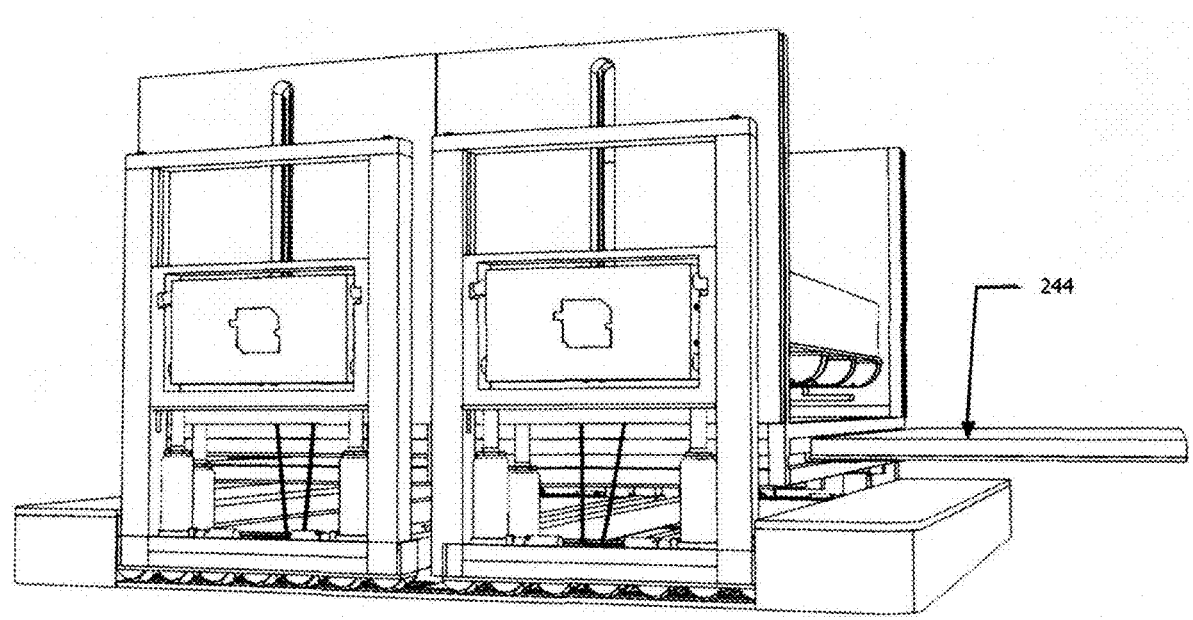
FIG. 53 is a perspective view of the joined bed-pairing of the present invention.
Figure 54:
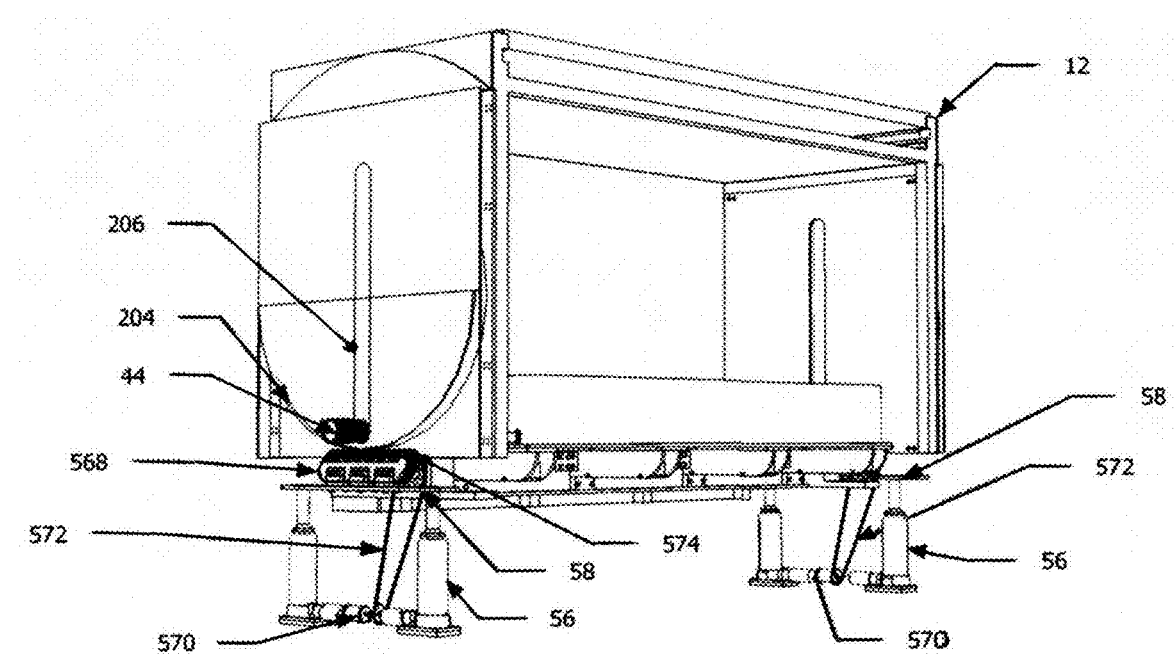
FIG. 54 is a cross sectional view of the cover, motorized lifting device groups and cover motor assemblies of the present invention.
Figure 55:
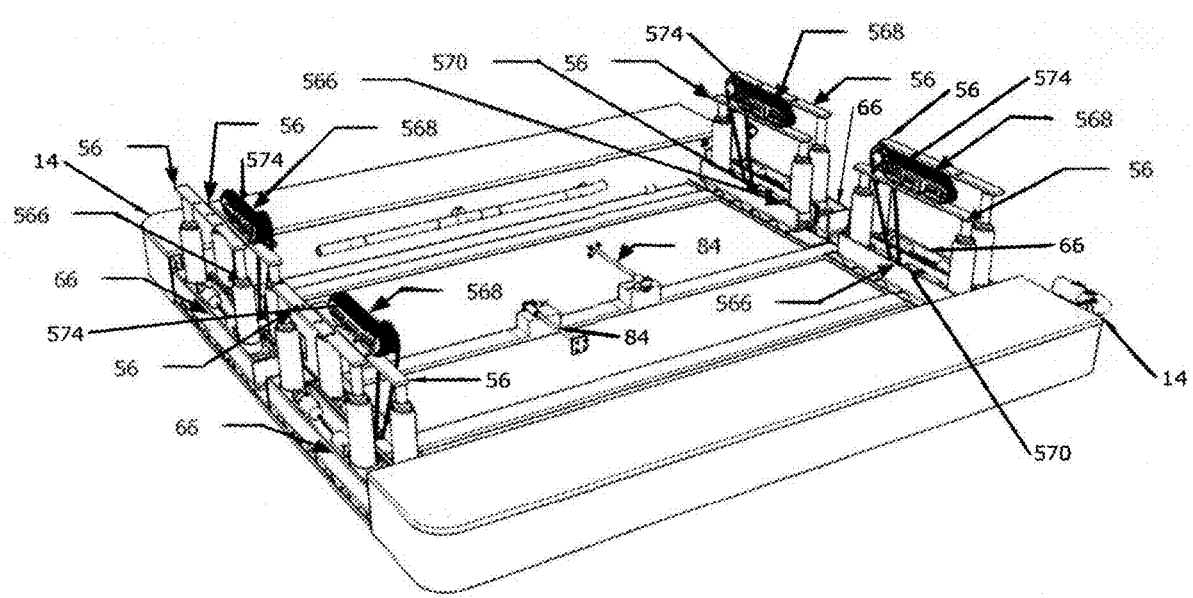
FIG. 55 is a perspective view of the motorized lifting device groups and cover motor assemblies of the present invention.

The bed frame and optional and independent cover, together, converts to a plurality of positions of which some positions are described as follows.

Example 1

As referenced above, the cover can be rotated on its horizontal axis generally up to 360 degrees. In addition, one door may be opened and seated on the top of the roof while the other door remains closed and both doors can be opened and seated on top of the roof and both doors can remain closed. Two single-sized or twin-sized bed frames and covers, rotated 180 degrees such that the roofs are inverted, connected to each other with a mattress attachment between them form a joined bed-pairing with larger mattress area. From this position, the two bed frames and covers can be separated from each other with the mattress attachment lowered providing distance between the bed frames and covers.

Example 2

In a bed pair, when the bed frames are separated and one cover remains inverted, the cover on the other bed frame can be horizontally rotated 90 degrees on its axis with one door completely open. This provides privacy and particularly sound and light suppression for individuals situated on either side of the open door.

Example 3

In a bed-pairing, when the bed frames are separated and one cover remains inverted, the cover on the other bed frame can be horizontally rotated generally 180 degrees on its axis with both doors closed providing privacy and particularly sound and light suppression for individuals situated in each bed-unit.

Example 4

In a bed-pairing, when the bed frames are separated and both covers have been horizontally rotated 180 degrees on their axis with all doors closed this provides complete privacy and particularly sound and light suppression for each individual situated in each bed-unit.

Example 5

In a bed-pairing, when the bed frames are separated from each other with a mattress attachment in the raised position and both covers have been horizontally rotated generally 180 degrees on their axis and the doors furthest from the mattress attachment are closed and the doors closest to the mattress attachment are opened, this provides complete privacy and particularly sound and light suppression for an individual or individuals situated on either side of the generally joined covers and an intimate environment for the individuals within the generally joined covers.

Example 6

In a bed-pairing, when the bed frames are separated and both covers are inverted and two doors on one cover remain closed, this provides a secure enclosure thereby inhibiting an individual situated in that bed from falling out of that bed.

Example 7

In a bed-pairing, when the bed frames are separated from each other with a mattress attachment in the raised position and both covers inverted and one door furthest away from the mattress attachment on one cover remaining closed, this provides a secure enclosure thereby inhibiting an individual situated on that side of the joined bed-pairing from falling out of bed.

Example 8

A bed-unit, when the cover has been horizontally rotated generally 180 degrees on its axis with all doors closed, provides complete privacy and particularly sound and light suppression for an individual or individuals situated within the bed-unit and outside of the bed-unit.

Example 9

A bed-unit, when the cover has been horizontally rotated generally 180 degrees on its axis with one door closed provides a secure enclosure thereby inhibiting an individual situated in that bed from falling out of that bed.

INDUSTRIAL APPLICABILITY

As described above, the present invention is susceptible of industrial application as it can be manufactured from raw materials and can be used as a device to limit sleep disruption of bed occupants.

I claim:
1. A capably joinable and capably disjoinable bed frame and capably movable and capably rotating cover, comprising;
   a beam wherein said beam is an elongated member and wherein said beam is connected to a plane of a plate along a longitudinal axis of said plate and wherein each opposing end of said beam is connected to a column comprising of rigid material,
   elongated rod members wherein one elongated rod member is capably pivotally connected at one end to a column and the opposing end of said elongated rod member is connected to a receptacle and the other elongated rod member Is capably pivotally connected at one end to the other column and the opposing end of said elongated rod member is connected to a receptacle wherein said receptacles are rigid members with rigid pegs protruding from each opposing end of each said receptacle,
   receptacle frames wherein each said receptacle is situate within a receptacle frame wherein protruding from each opposing end of each of said receptacle frame is a rigid peg and wherein said receptacle's said rigid pegs protrude from each opposing end of said receptacle to capably pivotally connect to each opposing end of said receptacle frame,
   upright members wherein each said receptacle frame is situate between upright members wherein said receptacle frame's said rigid pegs capably move within longitudinal slots of said upright members,
   mechanical devices wherein each said receptacle frame is connected to a first mechanical device wherein said first mechanical device is capable of producing vertical movement,
   combinations of a cylindrical member and a wall each said combination comprising a cylindrical member and a wall wherein a plane of said wall is connected to a plane of said cylindrical member;
   a roof wherein connected to one end of said roof is said wall of one of said combination of a cylindrical member and a wall and connected to the other end of said roof is said wall of the other said combination of a cylindrical member and a wall wherein one said elongated rod member is situate wherein said elongated rod member capably traverses through an elongated opening of said wall and said cylindrical member of one said combination of a cylindrical member and a wall wherein both ends of said elongated rod member are simultaneously situate outside both a plane of said wall and a plane of said cylindrical member of one said combination of a cylindrical member and a wall and the other said elongated rod member is situate wherein the other said elongated rod member capably traverses through an elongated opening of said wall and said cylindrical member of the other said combination of a cylindrical member and a wall wherein both ends of the other said elongated rod member are simultaneously situate outside both a plane of said wall and a plane of said cylindrical member of the other said combination of a cylindrical member and a wall, roof guides wherein each said roof guide is an elongated member and wherein each roof guide is connected to a roof guide-way wherein said roof guide-way is a structural member and wherein said roof guide-way is connected to said roof by a guide bar wherein said guide bar is an elongated member capably movably connected at each longitudinal end of said guide bar to one of two of said roof guides wherein said guide bar capably moves along each of said roof guide's longitudinal axis, a door wherein said door is capably pivotally connected to said guide bar along a longitudinal axis of said guide bar wherein said door is capably stowable on said roof guides and wherein said door is capably pivotable wherein each longitudinal end of said door capably movably connects to each wall and wherein two opposing ends of each said wall extend beyond the width of said plate, rotational treads wherein each said cylindrical member is capably connected to a rotational tread wherein said rotational tread capably produces bi-directional rotational movement wherein each said cylindrical member is capably rotatable and wherein each said rotational tread is connected to a second mechanical device wherein said second mechanical device capably produces vertical movement, cross supports wherein each said cross support is an elongated housing structure and wherein each said cross support is connected to said plane of said plate wherein said cross support and said beam connect to said plane of said plate, push-pull assemblies wherein said push-pull assembly comprises an elongated member and wherein said push-pull assembly capably moves within said cross support and wherein said push-pull assembly capably extends out of said cross support and wherein said push-pull assembly capably extends into and capably connects to a cross support of a capably joinable and capably disjoinable bed frame and capably movable and capably rotating cover unit, a mattress attachment wherein said mattress attachment comprises of a mattress capably connectable to an end of a hanger assembly wherein said hanger assembly is an elongated member wherein pivotally connected to the other end of said hangar assembly comprises a wheel wherein said wheel capably moves along a wheel path of said cross support and wherein said mattress attachment is capably pivotable between a first position wherein a side of said mattress attachment is beyond a plane of said plate to a second position wherein is a stowed position wherein a side of said mattress attachment is beyond the other plane of said plate, and a support frame wherein said support frame is connected to an end of each of said upright members wherein said support frame is capably connected to a plurality of wheels capably producing omnidirectional movement wherein said support frame capably moves omnidirectionally and wherein capably connected to said support frame is each of said first and second mechanical devices.

2. The capably joinable and capably disjoinable bed frame and capably movable and capably rotating cover of claim 1, further comprising a separation door wherein said separation door comprises a panel and wherein said separation door is capably pivotally connected to a plane of said roof along said roof's longitudinal axis wherein each opposing end of said separation door is between each said wall of said combination of a cylindrical member and a wall.

3. The capably joinable and capably disjoinable bed frame and capably movable and capably rotating cover of claim 1, further comprising a track wherein said track comprises an elongated member wherein said omnidirectional wheels capably move along said track.

4. The capably joinable and capably disjoinable bed frame and capably movable and capably rotating cover of claim 1, further comprising a step wherein said step is connected to said support frame and wherein said step comprises a cavity and wherein said tread is capably pivotally connected to a riser.

* * * * *